United States Patent
Hayase et al.

(10) Patent No.: US 11,960,586 B2
(45) Date of Patent: Apr. 16, 2024

(54) FACE RECOGNITION SYSTEM, FACE MATCHING APPARATUS, FACE RECOGNITION METHOD, AND STORAGE MEDIUM

(71) Applicant: NEC Corporation, Tokyo (JP)

(72) Inventors: Noriaki Hayase, Tokyo (JP); Hiroshi Tezuka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/859,463

(22) Filed: Jul. 7, 2022

(65) Prior Publication Data

US 2022/0335751 A1 Oct. 20, 2022

Related U.S. Application Data

(63) Continuation of application No. 16/079,245, filed as application No. PCT/JP2017/006863 on Feb. 23, 2017, now abandoned.

(30) Foreign Application Priority Data

Feb. 26, 2016 (JP) ................................ 2016-036407

(51) Int. Cl.
G06F 21/32 (2013.01)
G06F 18/22 (2023.01)
(Continued)

(52) U.S. Cl.
CPC .............. *G06F 21/32* (2013.01); *G06F 18/22* (2023.01); *G06V 10/761* (2022.01);
(Continued)

(58) Field of Classification Search
None
See application file for complete search history.

(56) References Cited

U.S. PATENT DOCUMENTS

| 8,659,697 B2* | 2/2014 | Capata | H04N 23/61 |
| | | | 348/169 |
| 8,848,985 B2* | 9/2014 | Inoue | G06F 18/28 |
| | | | 382/118 |

(Continued)

FOREIGN PATENT DOCUMENTS

| JP | 2005-050103 A | 2/2005 |
| JP | 2007-249588 A | 9/2007 |

(Continued)

OTHER PUBLICATIONS

JP Office Action for JP Application No. 2022-002686, dated Jan. 31, 2023 with English Translation.

(Continued)

*Primary Examiner* — Tsung Yin Tsai
(74) *Attorney, Agent, or Firm* — Sughrue Mion, PLLC

(57) ABSTRACT

A face recognition system including: a reading unit that reads identification information from a medium carried by an authentication subject; an image capturing unit that acquires an image; a face detection unit that detects, as a detected face image, a face image from the image acquired; a face matching unit that, when a registered face image associated with the identification information read by the reading unit is present, matches the detected face image against the registered face image and matches, against the registered face image, the detected face image captured before the reading unit reads the identification information; and a registration unit that, when the registered face image associated with the identification information read is not present, registers, as the registered face image, the detected face image before the reading unit reads the identification information.

13 Claims, 18 Drawing Sheets

(51) Int. Cl.
  *G06V 10/74*     (2022.01)
  *G06V 40/16*     (2022.01)
  *G06V 40/40*     (2022.01)

(52) U.S. Cl.
  CPC .......... *G06V 40/161* (2022.01); *G06V 40/168* (2022.01); *G06V 40/172* (2022.01); *G06V 40/173* (2022.01); *G06V 40/40* (2022.01)

(56) References Cited

U.S. PATENT DOCUMENTS

| | | | |
|---|---|---|---|
| 9,553,874 B2 | 1/2017 | Fujiwara et al. | |
| 10,621,838 B2* | 4/2020 | Viswanathan | G08B 13/19684 |
| 2002/0191817 A1* | 12/2002 | Sato | G06V 40/172 382/118 |
| 2003/0039380 A1* | 2/2003 | Sukegawa | G06F 18/28 382/118 |
| 2006/0262187 A1* | 11/2006 | Takizawa | G06V 40/172 348/77 |
| 2007/0076921 A1* | 4/2007 | Living | G06V 10/56 382/103 |
| 2007/0291998 A1* | 12/2007 | Takizawa | G07C 9/37 382/118 |
| 2008/0240563 A1* | 10/2008 | Takano | H04N 23/635 382/173 |
| 2008/0240663 A1 | 10/2008 | Takano | H04N 5/23293 382/173 |
| 2009/0232364 A1* | 9/2009 | Hosoi | H04N 23/61 382/118 |
| 2009/0296989 A1* | 12/2009 | Ramesh | G06V 20/52 382/103 |
| 2011/0153362 A1* | 6/2011 | Valin | G06Q 20/1085 340/5.82 |
| 2013/0083963 A1* | 4/2013 | Okamoto | G06V 40/161 382/103 |
| 2013/0136313 A1* | 5/2013 | Maeda | G06V 40/172 382/111 |
| 2015/0125046 A1* | 5/2015 | Ikenoue | G06F 21/32 382/115 |
| 2015/0131872 A1* | 5/2015 | Ganong | G06Q 30/0241 382/118 |
| 2015/0268422 A1 | 9/2015 | Wada | G06V 40/173 382/118 |
| 2015/0269422 A1* | 9/2015 | Wada | G06V 40/173 382/118 |
| 2015/0289422 A1 | 9/2015 | Wada | |
| 2016/0275518 A1* | 9/2016 | Bowles | G06V 40/166 |
| 2019/0050631 A1* | 2/2019 | Hayase | G06T 7/38 |
| 2019/0188980 A1* | 6/2019 | Viswanathan | G08B 13/19684 |

FOREIGN PATENT DOCUMENTS

| | | | |
|---|---|---|---|
| JP | 2007249953 A | 9/2007 | |
| JP | 2009-199223 A | 9/2009 | |
| JP | 2012-027668 A | 2/2012 | |
| JP | 2013-077067 A | 4/2013 | |
| JP | 2013-152643 A | 8/2013 | |
| JP | 2014-115784 A | 6/2014 | |
| JP | 2015011656 A | 1/2015 | |
| JP | 2015-26318 A | 2/2015 | |
| JP | 2015179423 A | 10/2015 | |

OTHER PUBLICATIONS

Japanese Office Action for JP Application No. 2020-068549 dated Jul. 6, 2021 with English Translation.

Yulo Komatsu et al., "Masquerade detection technology for IC card access control system", Institute of Electrical Engineers of Japan study group materials, Japan, Electricity Society, Aug. 24, 2012, pp. 13-16.

Communication dated Feb. 18, 2020 by the Japanese Patent Office in application No. 2018-601768.

Communication dated Aug. 1, 2019 from the Japanese Patent Office in application No. 2018-501766.

NEC Corporation, "Face Authentication: Gate System", [online], [searched on Feb. 12, 2016], Internet <URL: http://jpn.nec.com/ad/usj/entry.html>.

International Search Report of PCT/JP2017/006863 dated May 30, 2017 (PCT/ISA/210).

International Preliminary Report on Patentability of PCT/JP2017/006863 dated Jun. 27, 2018 [PCT/IPEA/409].

\* cited by examiner

FIG. 4

| DETECTION NO. | CAPTURING TIME | DETECTED FACE IMAGE | FACE FEATURE AMOUNT |
|---|---|---|---|
| 1 | 2016/02/01 08:30:01 | | [FACE FEATURE AMOUNT D1] |
| 2 | 2016/02/01 08:30:02 | | [FACE FEATURE AMOUNT D2] |
| 3 | 2016/02/01 08:30:03 | | [FACE FEATURE AMOUNT D3] |
| 4 | 2016/02/01 08:30:04 | | [FACE FEATURE AMOUNT D4] |
| 5 | 2016/02/01 08:30:05 | | [FACE FEATURE AMOUNT D5] |
| 6 | 2016/02/01 08:30:06 | | [FACE FEATURE AMOUNT D6] |
| ⋮ | ⋮ | ⋮ | ⋮ |

FACE RECOGNITION SYSTEM, FACE MATCHING APPARATUS, FACE RECOGNITION METHOD, AND STORAGE MEDIUM

CROSS-REFERENCE TO RELATED APPLICATIONS

The present application is a continuation application of U.S. patent application Ser. No. 16/079,245 filed on Aug. 23, 2018, which is a National Stage Entry of international application PCT/JP2017/006863 filed on Feb. 23, 2017, which claims the benefit of priority from Japanese Patent Application No. 2016-036407 filed on Feb. 26, 2016, the disclosures of all of which are incorporated in their entirety by reference herein.

TECHNICAL FIELD

The present invention relates to a face recognition system, a face matching apparatus, a face recognition method, and a storage medium.

BACKGROUND ART

In recent years, biometric authentication that performs authentication using biometric information that is information on a physical feature or behavior feature of a human has been utilized in a situation of identity verification. Face authentication that is one of the forms of biometric authentication is advantageous because of less mental stress at an authentication subject, ability of authentication from a distant place, a mental deterrent effect against a fraud, or the like.

Face authentication technologies have been utilized for identity verification in various fields. For example, in a gate system installed in an entrance gate of a facility such as a theme park, a face authentication technology is utilized for identity verification of visitors who use a ticket such as annual pass thereof or the like (Non Patent Literature 1).

CITATION LIST

Non Patent Literature

NPL 1: NEC Corporation, "Face Authentication: Gate System", [online], [searched on Feb. 12, 2016], Internet <URL: http://jpn.nec.com/ad/usj/entry.html>

SUMMARY OF INVENTION

Technical Problem

In face authentication for a visitor or the like using a ticket, a registered face image registered in advance in association with the ticket is used for matching with a face image of the visitor. However, there is a case of not-registered where no registered face image has been registered in advance. For example, a registered face image may be registered in association with a ticket when the ticket is used for the first time. In such a case, it is necessary to capture a face image to register a registered face image at the site of performing face authentication.

In the case described above, in the registration of a registered face image, it is necessary for the staff of a facility to operate a camera used for capturing a face image of a visitor. Further, in capturing of a face image, it is necessary for a visitor to position its face. However, it is difficult to smoothly register a registered face image if the staff of the facility operates a camera or a visitor positions its face.

The present invention intends to provide a face recognition system, a face matching apparatus, a face recognition method, and a storage medium that can smoothly register a registered face image when no registered face image used for matching in face authentication is present.

Solution to Problem

According to one example aspect of the present invention, provided is a face recognition system including: a reading unit that reads identification information from a medium carried by an authentication subject; an image capturing unit that acquires an image; a face detection unit that detects, as a detected face image, a face image from the image acquired by the image capturing unit; a face matching unit that, when a registered face image associated with the identification information read by the reading unit is present, matches the detected face image detected by the face detection unit against the registered face image and matches, against the registered face image, the detected face image captured by the image capturing unit before the reading unit reads the identification information; and a registration unit that, when the registered face image associated with the identification information read by the reading unit is not present, registers, as the registered face image, the detected face image captured by the image capturing unit before the reading unit reads the identification information According to another example aspect of the present invention, provided is a face matching apparatus including: a face detection unit that detects a face image as a detected face image from an image acquired by an image capturing unit that captures the image; a face matching unit that, when a registered face image associated with the identification information read by the reading unit that reads identification information from a medium carried by an authentication subject is present, matches the detected face image detected by the face detection unit against the registered face image and matches, against the registered face image, the detected face image captured by the image capturing unit before the reading unit reads the identification information; and a display unit that, when the registered face image associated with the identification information read by the reading unit is not present, displays the detected face image captured by the image capturing unit before the reading unit reads the identification information so that the detected face image to be registered as the registered face image can be visually selected.

According to yet another example aspect of the present invention, provided is a face recognition method including: an image capturing step of acquiring an image; a detection step of detecting, as a detected face image, a face image from the image acquired by the image capturing step; a reading step of reading identification information from a medium carried by an authentication subject; a matching step of, when a registered face image associated with the identification information read by the reading step is present, matching the detected face image detected in the face detection step against the registered face image and matching, against the registered face image, the detected face image captured in the image capturing step before reading the identification information in the reading step; and a registration step of, when the registered face image associated with the identification information read in the reading step is not present, registering, as the registered face image, the detected face image captured in the image capturing step before reading the identification information in the reading step.

According to still another example aspect of the present invention, provided is a storage medium in which a program is stored, wherein the program causes a computer apparatus to execute: a detection step of detecting a face image as a detected face image from an image; a matching step of, when a registered face image associated with the identification information read from a medium carried by an authentication subject is present, matching the detected face image detected in the face detection step against the registered face image and matching, against the registered face image, the detected face image captured before reading the identification information; and a display step of, when the registered face image associated with the identification information read from the medium carried by the authentication subject is not present, displaying the detected face image to be registered as the registered face image to be able to be visually selected.

Advantageous Effects of Invention

According to the present invention, a registered face image can be smoothly registered when no registered face image used for matching in face authentication is present.

BRIEF DESCRIPTION OF DRAWINGS

FIG. 4 is a schematic diagram illustrating an example of various data for detected face images temporarily stored in a storage unit of a face matching apparatus in the face recognition system according to the first example embodiment of the present invention.

DESCRIPTION OF EMBODIMENTS

First Example Embodiment

A face recognition system and a face recognition method according to a first example embodiment of the present invention will be described by using FIG. 1 to FIG. 12.

Figure 1:
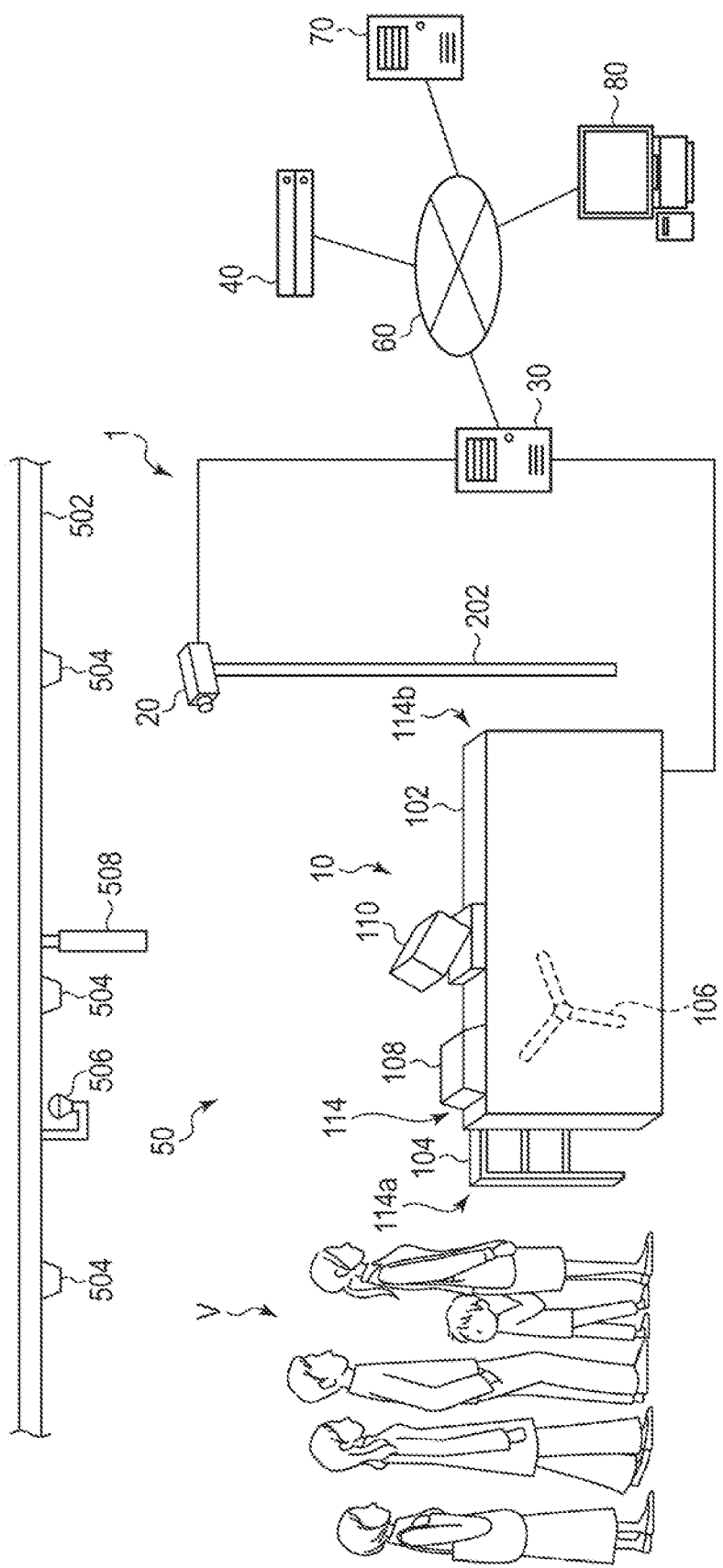
FIG. 1 is a schematic diagram illustrating a face recognition system according to a first example embodiment of the present invention.
Figure 2:
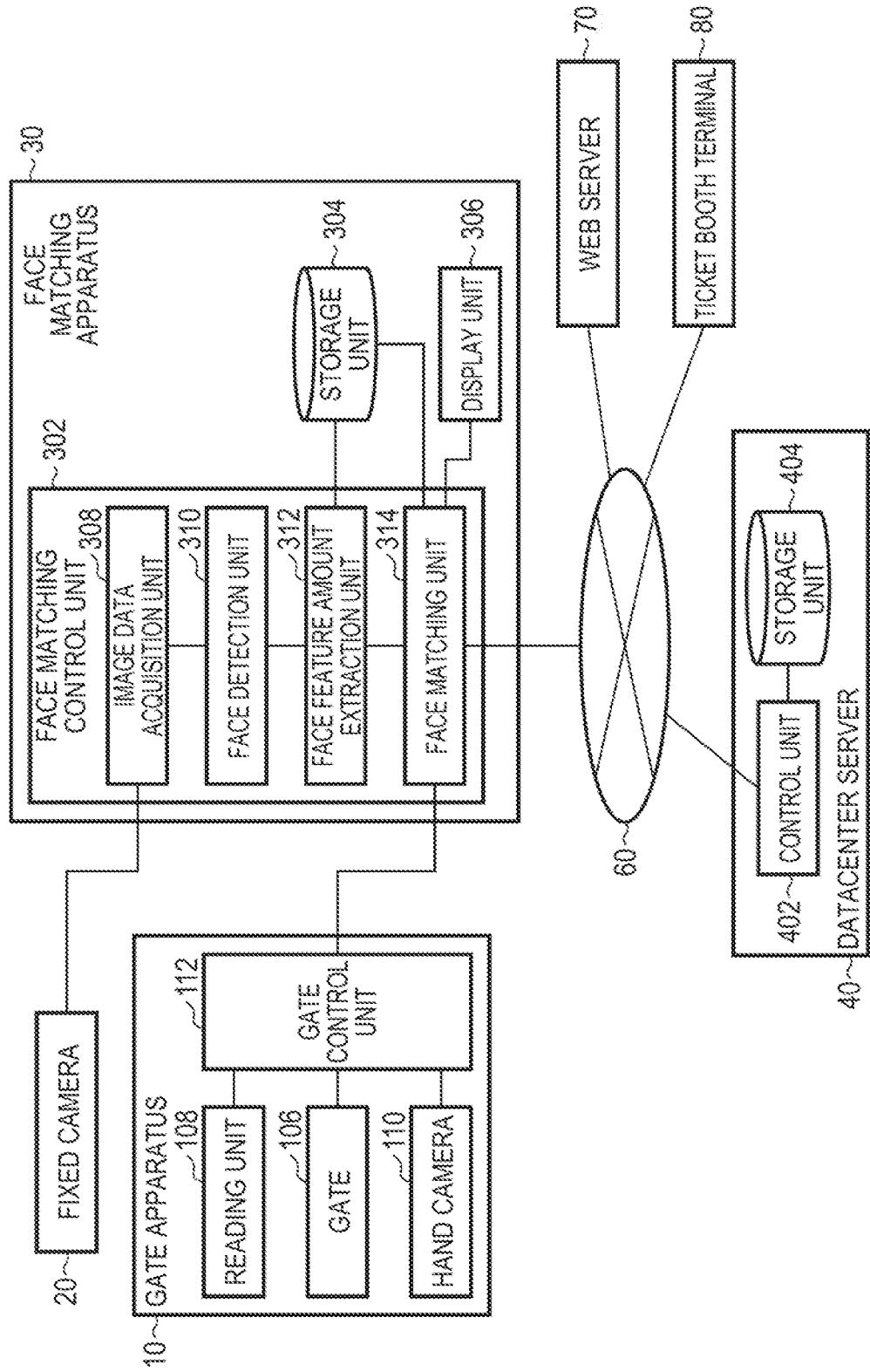
FIG. 2 is a block diagram illustrating a functional configuration of the face recognition system according to the first example embodiment of the present invention.
Figure 3:
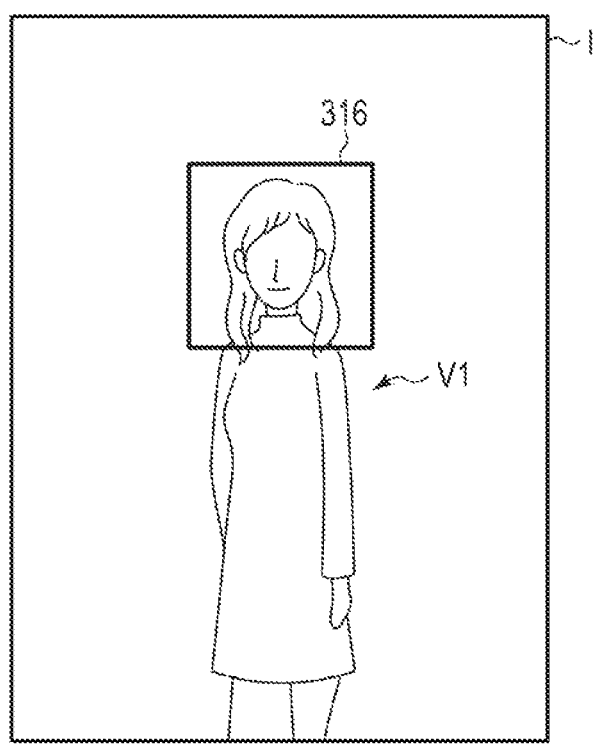
FIG. 3 is a schematic diagram illustrating an example of an image captured by a fixed camera in the face recognition system according to the first example embodiment of the present invention.
Figure 5:
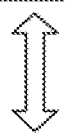
FIG. 5 is a schematic diagram illustrating an example of a process of N:1 matching in the face recognition system according to the first example embodiment of the present invention.
Figure 6:
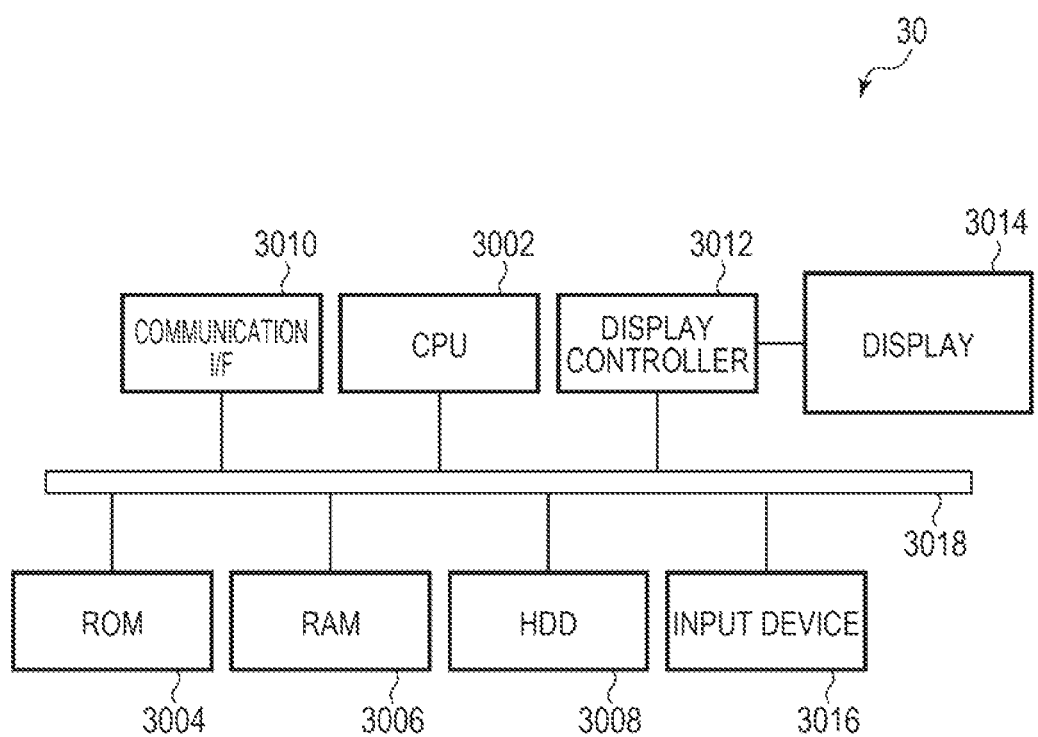
FIG. 6 is a block diagram illustrating an example of a hardware configuration of a face matching apparatus in the face recognition system according to the first example embodiment of the present invention.
Figure 7:
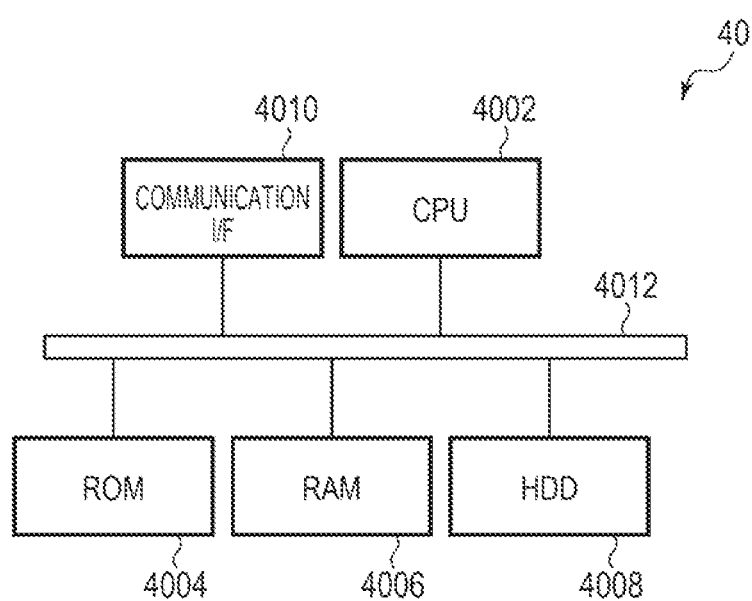
FIG. 7 is a block diagram illustrating an example of a hardware configuration of a datacenter server in the face recognition system according to the first example embodiment of the present invention.

First, the face recognition system according to the present example embodiment will be described by using FIG. 1 to FIG. 7. FIG. 1 is a schematic diagram illustrating a face recognition system according to the present example embodiment. FIG. 2 is a block diagram illustrating a functional configuration of the face recognition system according to the present example embodiment. FIG. 3 is a schematic diagram illustrating an example of an image captured by a fixed camera in the face recognition system according to the present example embodiment. FIG. 4 is a schematic diagram illustrating an example of various data for detected face images temporarily stored in a storage unit of a face matching apparatus in the face recognition system according to the present example embodiment. FIG. 5 is a schematic diagram illustrating an example of a process of N:1 matching in the face recognition system according to the present example embodiment. FIG. 6 is a block diagram illustrating an example of a hardware configuration of a face matching apparatus in the face recognition system according to the present example embodiment. FIG. 7 is a block diagram illustrating an example of a hardware configuration of a datacenter server in the face recognition system according to the present example embodiment.

The face recognition system according to the present example embodiment performs identity verification by using face matching at the entrance gate of a facility, where an authentication subject is a visitor who intends to enter the facility by using an admission ticket. For example, the facility may be a theme park, an event hall, a stadium, a concert hall, or the like. For example, a ticket used by a visitor is an admission ticket called an annual pass, an annual passport, or the like with which the visitor can enter the facility any times during a particular period such as a year or the like, although the type thereof is not limited in particular. The admission ticket may be a paper ticket or an electronic ticket as long as it is a medium in which identification information that identifies the admission ticket is recorded in a readable manner. A case of identity verification by using face matching when a visitor uses an annual pass to enter a facility will be described below.

As illustrated in FIG. 1 and FIG. 2, the face recognition system 1 according to the present example embodiment includes a gate apparatus 10, a fixed camera 20, a face matching apparatus 30, and a datacenter server 40. The gate apparatus 10, the fixed camera 20, and the face matching apparatus 30 are installed at an entrance gate 50 of a facility. On the other hand, the datacenter server 40 is installed within a datacenter located in a remote place of the entrance gate 50, for example.

At the entrance gate 50 where the gate apparatus 10 and the like are installed, a roof 502 is installed. A lighting apparatus 504 is provided to the roof. Further, a guide plate 508 indicating the entrance gate 50 is provided to the roof 502 so as to be located above the gate apparatus 10.

The face matching apparatus 30 and the datacenter server 40 are connected to a network via a network 60, respectively, and can be communicated with each other via the network 60. The network 60 may be a Wide Area Network (WAN) or a Local Area Network (LAN), for example, although the type thereof is not limited in particular.

Further, the gate apparatus 10 and the fixed camera 20 are directly, locally connected in a communicable manner to the face matching apparatus 30 through cable connection or the like, respectively. The connection among the gate apparatus 10, the fixed camera 20, and the face matching apparatus 30 may be of a wired scheme or a wireless scheme.

An annual pass can be purchased from a web ticket store or a ticket booth. A web server 70 that provides a web ticket store and a ticket booth terminal 80 are connected to the network 60. The web server 70 and the ticket booth terminal 80 can communicate with the datacenter server 40 via the network 60, respectively. The web server 70 is installed inside a datacenter located in a remote place of the entrance gate 50, for example. The ticket booth terminal 80 is installed inside the ticket booth neighboring the entrance gate 50, for example.

Next, each component of the face recognition system 1 according to the present example embodiment will be described in detail.

The gate apparatus 10 has a main unit 102, a fence 104, a gate 106, a reading unit 108, a hand camera 110, and a gate control unit 112.

The main unit 102 and the fence 104 are installed so as to face each other. A path 114 through which a visitor walks to enter the facility runs between the main unit 102 and the fence 104. On the path 114, an entrance 114a is outside, and an exit 114b is inside. The main unit 102 is installed on the right side when viewed from the entrance 114a to the exit 114b of the path 114. On the other hand, the fence 104 is installed on the left side when viewed from the entrance 114a to the exit 114b of the path 114.

The gate 106 is provided on the sidewall on the main unit 102 on the path 114 so as to block the path 114 during a standby state. When opened from a closed state during a standby state for blocking the path 114, the gate 106 allows a visitor to walk through the path 114 and enter the inside of the facility. The gate 106 is a turn-style gate in which three bars rotate, for example. Note that, without limited to the above, various types of gates may be used as a gate. For example, as the gate 106, a flapper gate in which two flappers provided on both sides or a single flapper provided on one side of the path 114 is opened and closed may be used.

As described later, the gate 106 is opened when identity verification by face matching is successful. Thereby, the visitor is allowed to walk through the path 114 and enter the inside of the facility.

Note that the gate 106 may be a gate that is in an opened state during a standby state and maintains the opened state when identity verification by face matching is successful, and is closed when identity verification by face matching is failed.

The reading unit 108 is provided on a portion on the entrance 114a side on the path 114 of the gate 106 on the top of the main unit 102. The reading unit 108 reads information recorded in an annual pass carried by a visitor from the annual pass. Specifically, in an annual pass, identification (ID) information that is identification information uniquely identifying the annual pass is recorded. The reading unit 108 reads ID information from an annual pass. The ID information read by the reading unit 108 may be a member number, a serial number, or the like of the annual pass, for example. An annual pass is a medium that is carried by a visitor who is an authentication subject and required when the visitor enters the inside of the facility and on which ID information uniquely identifying itself is recorded. Here, the medium may be a medium, such as a card, a sheet, a smartphone, or the like, which has information identifying an authentication subject. As described later, information on purchasers who have purchased the annual passes in association with ID information of the annual passes is accumulated in the datacenter server 40.

The reading unit 108 has a reading scheme in accordance with a recording scheme of ID information on an annual pass. For example, when an annual pass has ID information recorded in a one-dimensional code such as a barcode or a two-dimensional code such as a QR code (registered trademark), the reading unit 108 is a code reader such as a barcode reader, a QR code reader, or the like. Further, for example, when an annual pass has ID information recorded in a non-contact IC card or a non-contact IC tug using Radio Frequency Identification (RFID), the reading unit 108 is an RFID reader.

When there is ticket presentation of an annual pass at the reading unit 108, the reading unit 108 reads ID information recorded in the annual pass from the annual pass. Note that ticket presentation here means that a visitor who is an authentication subject causes the reading unit 108 to read information including the ID information recorded in an annual pass.

The reading unit 108 transmits ID information read from an annual pass to the gate control unit 112 described later. Note that identification information identifying an authentication subject is not limited to ID information stored in a medium such as an annual pass. The identification information identifying an authentication subject may include biometric information of an authentication subject such as a finger print, a vein, an iris, or the like, for example, and may be any information that can identify an authentication subject. In this case, the reading unit 108 may be a finger print scanner, a vain scanner, a camera, or the like that can read biometric information such as a finger print, a vein, an iris, or the like of an authentication subject.

The hand camera 110 is provided to a portion near the gate 106 on the top of the main unit 102. The hand camera 110 is a digital video camera, for example, and can capture a face image of a visitor who is an authentication subject and acquire the face image according to an operation of the staff of the facility. The hand camera is other image-capturing units used when face matching based on a face image captured by the fixed camera 20 is failed. Note that the hand camera 110 may be any camera as long as it can acquire a face image of a visitor and may be a digital still camera.

The hand camera 110 transmits image data of the captured face image of a visitor to the gate control unit 112 described later.

The gate control unit 112 controls the operation of the gate apparatus 10. The reading unit 108 is connected to the gate control unit 112 so as to be able to communicate therewith. Further, the gate 106 is connected to the gate control unit 112 in a controllable manner. Further, the hand camera 110 is connected to the gate control unit 112 so as to be able to communicate therewith.

ID information of an annual pass read by the reading unit 108 is transmitted to the gate control unit 112 from the reading unit 108. The gate control unit 112 transmits ID information of an annual pass transmitted from the reading unit 108 to the face matching apparatus 30.

Further, the gate control unit 112 controls opening and closing of the gate 106 based on a matching result signal transmitted from the face matching apparatus 30 described later.

Further, image data of a face image of a visitor captured by the hand camera 110 is transmitted to the gate control unit 112 from the hand camera 110. The gate control unit 112 transmits image data of a face image transmitted from the hand camera 110 to the face matching apparatus 30.

The fixed camera 20 is fixed to the upper end of a support pillar 202 installed inside the facility with respect to the gate apparatus 10. The fixed camera 20 is an image capturing unit that captures an image of an area in front of the gate apparatus 10 and in which the orientation facing the side of the outside of the facility is fixed. The fixed camera 20 is fixed at a height located above a head of a human of a height of around 200 cm, for example, from the ground face at the entrance gate 50 and is directed obliquely downward to face an area in front of the gate apparatus 10. Note that a fixing scheme of the fixed camera 20 is not limited to a scheme using the support pillar 202. For example, the fixed camera 20 may be hanged from and fixed to the roof 502 of the entrance gate 50.

The fixed camera 20 fixed as described above captures an image of an area in front of the gate apparatus 10 that is the entrance side to the installation area of the gate apparatus 10 including the reading unit 108. That is, the fixed camera 20 captures an image on the entrance side to the installation area of the reading unit 108. Thereby, the fixed camera 20 can capture a visitor V in an area in front of the gate apparatus 10 that is the entrance side to the installation area of the reading unit 108. Therefore, the fixed camera 20 can capture an image including an authentication subject.

The fixed camera 20 is a digital video camera, for example, and is able to capture a moving image at a predetermined framerate to continuously acquire a plurality of images at a predetermined cycle synchronized with the framerate. For example, the fixed camera 20 is able to capture a moving image at 15 fps and continuously acquire images of 15 frame per second.

Note that the fixed camera 20 may be a digital still camera. In this case, the fixed camera 20 can be configured to continuously capture static images at a predetermined capturing interval and continuously acquire a plurality of images at a predetermined cycle.

Further, the fixed camera 20 may be a visible light camera or an infrared camera. When the fixed camera 20 is an infrared camera, an infrared lighting apparatus 506 that emits an infrared may be provided to the roof 502 of the entrance gate 50 in addition to the normal lighting apparatus 504 that emits an illumination light including a visible light. By using an infrared camera as the fixed camera 20 under the infrared lighting apparatus 506, it is possible to perform face matching based on a face image captured by the fixed camera 20 while reducing the influence by the brightness nearby.

Further, the fixed camera 20 is installed in a vertical orientation so as to capture a vertically long image. This enables the fixed camera 20 to capture an image including a visitor's face of a wide range of heights from a short visitor to a tall visitor. Specifically, the fixed camera 20 can capture an image including a face of a visitor whose height ranges from 99 cm to 220 cm, for example. Note that the fixed camera 20 is not necessarily required to be installed vertically but may be installed horizontally so as to capture a horizontally long image.

Faces of a plurality of visitors in an area in front of the gate apparatus 10 may be included in an image captured by the fixed camera 20.

The fixed camera 20 transmits image data of a plurality of images acquired at a predetermined cycle as described above to the face matching apparatus 30 in synchronization with the cycle.

The face matching apparatus 30 has a face matching control unit 302, a storage unit 304, and a display unit 306.

The face matching control unit 302 performs face matching based on a face image captured by the fixed camera 20. The face matching control unit 302 includes an image data acquisition unit 308, a face detection unit 310, a face feature amount extraction unit 312, and a face matching unit 314.

The image data acquisition unit 308 sequentially acquires image data of images transmitted from the fixed camera 20 at a predetermined cycle. Note that the image data acquisition unit 308 can perform image processing such as a correction process on the acquired image data.

The face detection unit 310 performs face detection on respective images of image data sequentially acquired from the image data acquisition unit 308. Thereby, the face detection unit 310 detects a face image of a visitor in an area in front of the gate apparatus 10 as a detected face image out of images of image data sequentially acquired by the image data acquisition unit 308. As an algorithm used by the face detection unit 310 for face detection, without being limited in particular, various algorithms may be used.

FIG. 3 illustrates an example of one frame of image captured by the fixed camera 20. As illustrated in FIG. 3, a single visitor V1 in an area in front of the gate apparatus 10 is captured in one frame of image I. The face detection unit 310 detects a face image of the visitor V1 as illustrated by a rectangular detection frame 316 in FIG. 3 from the image I captured by the fixed camera 20 in such a way.

Note that a plurality of visitors in an area in front of the gate apparatus 10 may be captured in one frame of image captured by the fixed camera 20. Further, the same person may be captured in different frames of images captured by the fixed camera 20. These cases will be described later.

The face feature amount extraction unit 312 extracts a face feature amount that is a feature amount of a face image for respective face images detected by the face detection unit 310. Note that a face image detected by the face detection unit 310 may be referred to as a detected face image below. The face feature amount is a vector amount and obtained by combining scaler amount components expressing the feature of a face image. As a component of a feature amount, without being limited in particular, various types thereof may be used. For example, as a component of a feature amount, a positional relationship such as a distance or an angle between feature points that are set at the center or the end of an organ of a face, such as an eye, a nose, a mouth, or the like, a curvature of the outline of a face, a color distribution or a shade and light value of the surface of a face, or the like can be used. The number of components of the feature amount may be set as appropriate in accordance with required matching accuracy, a processing speed, or the like without being limited in particular.

Further, the face feature amount extraction unit 312 temporarily stores face image data that is image data of the detected face image together with the face feature amount extracted from the detected face image in the storage unit 304 in association with each other. Furthermore, the face feature amount extraction unit 312 temporarily stores a detection number that is a number identifying the image data and the capturing time when the detected face image is captured in the storage unit 304 in association with each other for respective detected face images, together with face image data and the face feature amount thereof.

A relational database is configured in the storage unit 304. In the relational database of the storage unit 304, the face feature amount extracted by the face feature amount extraction unit 312 as described above is temporarily stored in association with a detection number, a capturing time, and a face image data. Such mutually associated data is managed by a Relational Database Management System (RDBMS). As an RDBMS, without being limited in particular, Microsoft (registered trademark) SQL Server is used, for example.

FIG. 4 is a schematic diagram illustrating an example of various data for detected face images temporarily stored in the storage unit 304 by the face feature amount extraction unit 312. As illustrated in FIG. 4, a detection number, a capturing time, face image data, and a face feature amount are associated with each other and temporarily stored in the storage unit 304 for respective detected face images.

In the storage unit 304, the face feature amount and data related thereto are stored for only a certain period from the capturing time for each detected face image. The face feature amount and data related thereto of a detected face image remaining after a certain time has elapsed from the capturing time are sequentially deleted from the relational database of the storage unit 304. For example, the face feature amount and data related thereto of the detected face image captured by the fixed camera 20 within the immediate past three minutes are temporarily stored in the storage unit 304.

When there is ticket presentation of an annual pass to the reading unit 108 of the gate apparatus 10, the face matching unit 314 performs identity verification by face matching for the visitor who performs ticket presentation of an annual pass at the reading unit 108.

ID information read by the reading unit 108 from the annual pass on the ticket presentation is transmitted to the face matching unit 314. The face matching unit 314 acquires the transmitted ID information and acquires, online, a face feature amount of a registered face image which is registered in association with the ID information via the network 60 from the datacenter server 40 described later. A person of the registered face image acquired by the face matching unit 314 as above is a valid user who can validly use the annual pass on the ticket presentation. A valid user of an annual pass is a purchaser who has purchased the annual pass, for example.

For some ID information, however, there may be a case of not-registered where neither associated registered face image nor face feature amount thereof is present in the datacenter server 40. For example, when an annual pass is used for the first time, neither registered face image associated with ID information of the annual pass nor face feature amount thereof may be present. A process for such a case of not-registered will be described after a process when a registered face image is present is described.

Further, the face matching unit 314 refers to the relational database of the storage unit 304 and acquires, offline, face feature amounts of N detected face images associated with the capturing time included in a predetermined period before ticket presentation that is before acquisition of ID information. That is, the face matching unit 314 acquires face feature amounts of N detected face images captured by the fixed camera 20 before the reading unit 108 reads ID information from an annual pass. Note that N is typically an integer greater than one, and a plurality of detected face images are acquired by the face matching unit 314. However, there may be a case where N is one and a single detected face image is acquired by the face matching unit 314. A predetermined period before ticket presentation is performed for acquiring a detected face image may be a period immediately before the ticket presentation, and the length thereof may be set as appropriate in accordance with required matching accuracy, a processing speed, or the like. For example, a predetermined period before ticket presentation for acquiring a detected face image can be set to several seconds immediately before the ticket presentation.

The face matching unit 314 performs a matching process that sequentially matches respective face feature amounts of N detected face images, which have been captured before ticket presentation of an annual pass, against a face feature amount of a registered face image. The matching process here is referred to as N:1 matching because matching of the maximum N detected face images against one registered face image is performed. As discussed above, the face matching unit 314 matches detected face images, which have been detected by the face detection unit 310 from images captured before acquisition of ID information, against a registered face image corresponding to the acquired ID information.

The face matching unit 314 calculates a matching score in accordance with a similarity between a face feature amount of a detected face image and a face feature amount of a registered face image in N:1 matching. The matching score is a larger value for a higher similarity between the face feature amount of a detected face image and the face feature amount of a registered face image. As a result of matching for a certain detected face image, the face matching unit 314 determines that the matching is unmatched if the matching score is less than a predetermined threshold and performs matching of the face feature amount of the next detected face image against the face feature amount of the registered face image. On the other hand, as a result of matching for a certain detected face image, the face matching unit 314 determines that the matching is matched if the matching score is greater than or equal to the predetermined threshold and completes the matching process.

The order of performing matching of face feature amounts against a registered face image for N detected face images is not limited in particular. For example, for N detected face images, matching of face feature amounts against a registered face image may be performed in ascending order or descending order of capturing time or at random. Further, a priority may be determined for each of the N detected face images, and the order of performing matching of face feature amounts against a registered face image may be determined based on the priority.

FIG. 5 is a schematic diagram illustrating an example of a process of N:1 matching performed by the face matching unit 314 in the present example embodiment. As illustrated in FIG. 5, face feature amounts of N detected face images captured in a predetermined period before ticket presentation are sequentially matched against a face feature amount of a registered face image registered in association with ID information of an annual pass on the ticket presentation. The order of performing matching of face feature amounts against a registered face image for N detected face images may be ascending order of capturing time, for example.

If the matching performed by the face matching unit 314 is matched, this means that a valid user of an annual pass on the ticket presentation has been included in visitors in front of the gate apparatus 10 before the ticket presentation. Thus, it can be estimated that a valid user of an annual pass performs the ticket presentation of the annual pass. Therefore, in this case, identity verification by face matching is successful.

On the other hand, if all the matching performed by the face matching unit 314 is unmatched, no valid user of an annual pass on the ticket presentation has been included in visitors in front of the gate apparatus 10 before the ticket presentation. Therefore, in this case, identity verification by face matching is failed.

A matching result or the like by the face matching unit 314 can be displayed on the display unit 306. The staff of the facility can confirm a matching result or the like by viewing the display on the display unit 306. Further, a registration window used for newly registering a registered face image can be displayed on the display unit 306, as described later.

The face matching unit 314 transmits a matching result signal that is a signal indicating the matching result described above to the gate apparatus 10. Specifically, the face matching unit 314 transmits, to the gate apparatus 10, a matching-matched signal that is a signal indicating that the matching by the face matching unit 314 is matched or a matching-unmatched signal that is a signal indicating that all the matching performed by the face matching unit 314 is unmatched.

The face matching apparatus 30 described above is formed of a computer apparatus, for example. An example of a hardware configuration of the face matching apparatus 30 will be described by using FIG. 6. Note that the face matching apparatus 30 may be formed of a single device or may be formed of two or more physically separated devices in wired connection or wireless connection.

As illustrated in FIG. 6, the face matching apparatus 30 has a central processing unit (CPU) 3002, a read only memory (ROM) 3004, a random access memory (RAM) 3006, and a hard disk drive (HDD) 3008. Further, the face matching apparatus 30 has a communication interface (I/F) 3010. Further, the face matching apparatus 30 has a display controller 3012 and the display 3014. Furthermore, the face matching apparatus 30 has an input device 3016. The CPU 3002, the ROM 3004, the RAM 3006, the HDD 3008, the communication I/F 3010, the display controller 3012, and the input device 3016 are connected to a common bus line 3018.

The CPU 3002 controls the entire operation of the face matching apparatus 30. Further, the CPU 3002 executes a program that implements the function of each unit of the image data acquisition unit 308, the face detection unit 310, the face feature amount extraction unit 312, and the face matching unit 314 in the face matching control unit 302 described above. The CPU 3002 loads a program stored in the HDD 3008 or the like to the RAM 3006 to implement the function of each unit of the face matching control unit 302.

The ROM 3004 stores a program such as a boot program therein. The RAM 3006 is used as a working area when the CPU 3002 executes a program. Further, the program executed by the CPU 3002 is stored in the HDD 3008.

Further, the HDD 3008 is a storage device that implements the function of the storage unit 304 described above. Note that a storage device that implements the function of the storage unit 304 is not limited to the HDD 3008. Various storage devices can be used for implementing the function of the storage unit 304.

The communication I/F 3010 is connected to the network 60. The communication I/F 3010 controls data communication with the datacenter server 40 connected to the network 60.

The display controller 3012 is connected to the display 3014 that functions as the display unit 306. The display controller 3012 causes a matching result from the face matching unit 314 to be displayed on the display 3014.

The input device 3016 may be a keyboard, a mouse, or the like, for example. Further, the input device 3016 may be a touch panel embedded in the display 3014. The staff of the facility can perform setting of the face matching apparatus 30 or input an instruction of execution of a process via the input device 3016.

Note that the hardware configuration of the face matching apparatus 30 is not limited to the configuration described above, but may be various configurations.

The gate control unit 112 of the gate apparatus 10 controls opening and closing of the gate 106 based on a matching result signal transmitted from the face matching unit 314. That is, the gate control unit 112 opens the gate 106 when a matching-matched signal is transmitted from the face matching unit 314. Thereby, a visitor performing ticket presentation is allowed to walk through the path 114 of the gate apparatus 10 to enter the inside of the facility as a person who has been successful in identity verification. The gate control unit 112 causes the gate 106 to be closed after the visitor walked through the path 114.

On the other hand, the gate control unit 112 maintains a closed state of the gate 106 when a matching-unmatched signal is transmitted from the face matching unit 314. At this time, the gate control unit 112 can sound an alert sound of a not-shown alarm provided to the gate apparatus 10, turn on an alert light, or the like to output a warning indicating that all the matching results are unmatched.

Further, as described later, when no registered face image is present, the gate control unit 112 opens the gate 106 in response to a registration completion signal transmitted from the datacenter server 40. The registration completion signal is a signal indicating that registration of a registered face image is completed in the datacenter server 40.

The datacenter server 40 has a control unit 402 and a storage unit 404.

The control unit 402 controls the operation of the datacenter server 40.

The storage unit 404 accumulates registered face images and face feature amounts thereof that are registered in association with ID information of issued annual passes.

The control unit 402 provides, to the face matching unit 314, a face feature amount of a registered face image registered in association with ID information of an annual pass on ticket presentation in response to a request from the face matching unit 314.

A registered face image can be uploaded on the web server 70 from a purchaser's terminal when an annual pass is purchased at a web store provided by the web server 70. The registered face image uploaded to the web server 70 is transmitted from the web server 70 to the datacenter server 40. In the datacenter server 40 to which the registered face image has been transmitted, the control unit 402 accumulates the transmitted registered face image in the storage unit 404.

Further, a purchaser who purchased an annual pass at a ticket booth may soon capture his/her registration face image by a hand camera (not shown) of the ticket booth. The registered face image captured by the hand camera of the thicket booth is transmitted to the datacenter server 40 via the network 60 by the ticket booth terminal 80 and accumulated in the storage unit 404 thereof.

However, the registered face image may not be registered when the annual pass is used for the first time. When no registered face image is present as discussed above, the control unit 402 functions as a registration unit that performs a registered process of a registered face image, as described later.

For a registered face image accumulated in the storage unit 404 of the datacenter server 40 as described above, the same face feature amount as the face feature amount extracted by the face feature amount extraction unit 312 of the face matching apparatus 30 is extracted. Extraction of a face feature amount is performed by the control unit 402 that functions as a face feature amount extraction unit. The extracted face feature amount is accumulated in the storage unit 404 by the control unit 402 in association with ID information of the annual pass with which the registered face image is associated.

A relational database is configured in the storage unit 404. In the relational database of the storage unit 404, face feature amounts of registered face images are stored in association with ID information of annual passes and face image data of the registered face images, as described above. Such mutually associated data is managed by an RDBMS. As an RDBMS, without being limited in particular, Microsoft (registered trademark) SQL Server is used, for example.

Note that, in the relational database of the storage unit 404, in addition to the above, pieces of information such as names, contact addresses, or the like of purchasers of annual passes who are valid users of the annual passes are stored in association with ID information of the annual passes, for example.

The datacenter server 40 described above is formed of a computer apparatus, for example. An example of a hardware configuration of the datacenter server 40 will be described by using FIG. 7. Note that the datacenter server 40 may be formed of a single device or may be formed of two or more physically separated devices by wired connection or wireless connection.

As illustrated in FIG. 7, the datacenter server 40 has a CPU 4002, a ROM 4004, a RAM 4006, and an HDD 4008. Further, the datacenter server 40 has a communication I/F 4010. The CPU 4002, the ROM 4004, the RAM 4006, the HDD 4008, and the communication I/F 4010 are connected to a common bus line 4012.

The CPU 4002 controls the entire operation of the datacenter server 40. Further, the CPU 4002 executes a program that implements the function of the control unit 402 described above. The CPU 4002 loads a program stored in the HDD 4008 or the like to the RAM 4006 to implement the function of the control unit 402.

The ROM 4004 stores a program such as a boot program therein. The RAM 4006 is used as a working area when the CPU 4002 executes a program. Further, the program executed by the CPU 4002 is stored in the HDD 4008.

Further, the HDD 4008 is a storage device that implements the function of the storage unit 404 described above. Note that a storage device that implements the function of the storage unit 404 is not limited to the HDD 4008. Various storage devices can be used for implementing the function of the storage unit 404.

The communication I/F 4010 is connected to the network 60. The communication I/F 4010 controls data communication with the face matching apparatus 30 connected to the network 60.

Note that the hardware configuration of the datacenter server 40 is not limited to the configuration described above, but may be various configurations.

As described above, the face recognition system 1 according to the present example embodiment matches a detected face image captured by the fixed camera 20 before ticket presentation, in which the reading unit 108 reads ID information from an annual pass is performed, against a registered face image registered in association with ID information of the annual pass on the ticket presentation. That is, in the face recognition system 1 according to the present example embodiment, a detected face image that is an image of a matching subject to be matched against a registered face image is acquired in advance before ticket presentation of an annual pass.

Thus, according to the present example embodiment, after a visitor performs ticket presentation of an annual pass, it is not necessary for the staff of the facility to capture a face image of the visitor as an image of a matching subject to be matched against a registered face image. Further, a visitor neither needs to concern about capturing of the face image thereof nor needs to perform a special move such as positioning of the face thereof for the capturing. Therefore, according to the present example embodiment, face matching can be made smoothly in a short time.

Next, a face recognition method according to the present example embodiment using the face recognition system 1 according to the above present example embodiment will be further described by using FIG. 8 to FIG. 11.

Figure 8:
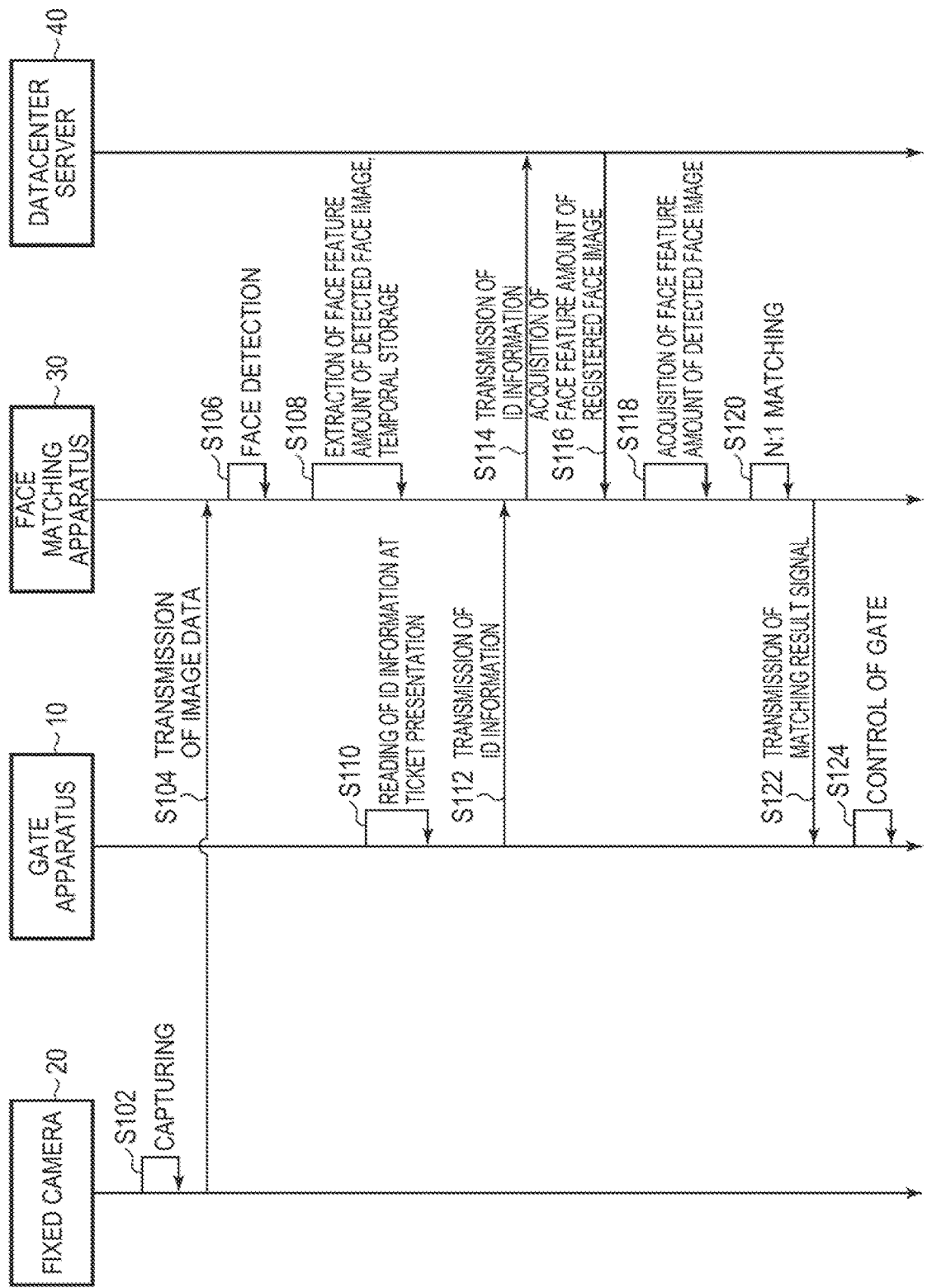
FIG. 8 is a sequence diagram illustrating a face recognition method according to the first example embodiment of the present invention.

First, the entire flow of the face recognition method according to the present example embodiment when a registered face image is present will be described by using FIG. 8. FIG. 8 is a sequence diagram illustrating the face recognition method according to the present example embodiment.

The fixed camera 20 captures an area in front of the gate apparatus 10 that is the entrance side to the installation area of the reading unit 108 and continuously acquires a plurality of images at a predetermined cycle (step S102). Further, the fixed camera 20 transmits image data of the plurality of images acquired at a predetermined cycle to the face matching apparatus 30 in synchronization with the cycle (step S404).

In the face matching apparatus 30 to which the image data has been transmitted, the image data acquisition unit 308 sequentially acquires image data transmitted from the fixed camera 20. The face detection unit 310 performs face detection for each image and detects a face image as a detected face image (step S106). The face feature amount extraction unit 312 extracts a face feature amount for each detected face image for temporary storage (step S108).

In the fixed camera 20 and the face matching apparatus 30, steps S102 to S108 described above are repeatedly performed.

On the other hand, when there is ticket presentation of an annual pass at the gate apparatus 10, the reading unit 108 reads ID information of the annual pass on the ticket presentation (step S110). Subsequently, the gate control unit 112 transmits ID information read by the reading unit 108 to the face matching apparatus 30 (step S112).

In the face matching apparatus 30 to which the ID information has been transmitted, the face matching unit 314 transmits the ID information to the datacenter server 40 via the network 60 (step S114) and requests a face feature amount of a registered face image registered in association with the ID information. Thereby, the face matching unit 314 acquires a face feature amount of a registered face image registered in association with the ID information online from the datacenter server 40 via the network 60 (step S116).

Further, the face matching unit 314 refers to a relational database of the storage unit 304 thereof and acquires, offline, face feature amounts of N detected face images associated with the capturing time included in a predetermined period before the ticket presentation (step S118). That is, the face matching unit 314 acquires face feature amounts of N detected face images captured by the fixed camera 20 before the reading unit 108 reads ID information from the annual pass.

Note that any one of the above step S116 and step S118 may be performed earlier or both of the above step S116 and step S118 may be performed at the same time.

Next, the face matching unit 314 performs N:1 matching based on the face feature amounts of the acquired detected face images and the face feature amount of the registered face image (step S120).

The face matching unit 314 that has performed N:1 matching transmits a matching result signal indicating a matching result to the gate apparatus 10 (step S122).

In the gate apparatus 10 to which the matching result signal has been transmitted, the gate control unit 112 controls opening and closing of the gate 106 based on the matching result signal (step S124).

Every time ticket presentation of an annual pass is performed at the reading unit 108 of the gate apparatus 10, steps S110 to S124 are repeatedly performed.

Figure 9:
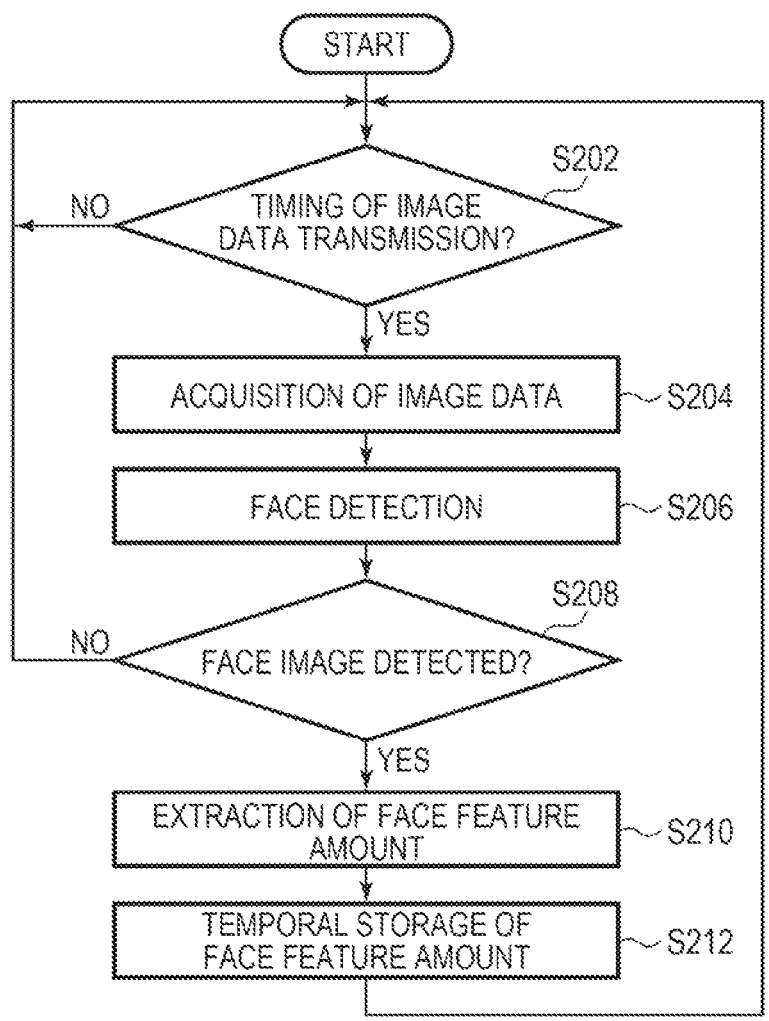
FIG. 9 is a flowchart (part 1) illustrating the face recognition method according to the first example embodiment of the present invention.
Figure 10:
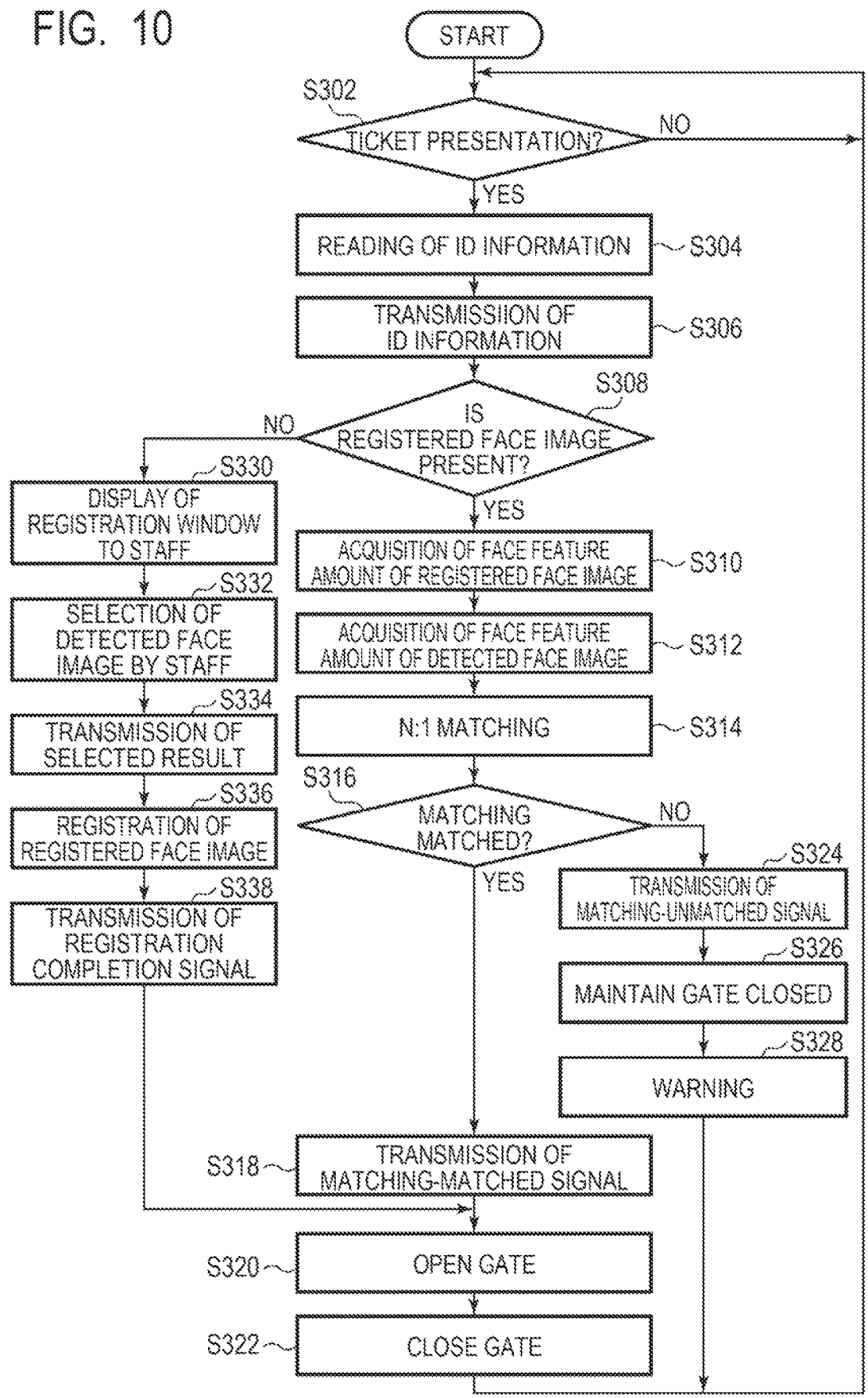
FIG. 10 is a flowchart (part 2) illustrating the face recognition method according to the first example embodiment of the present invention.

Next, details of the process in the face recognition method according to the present example embodiment will be described by using FIG. 9 and FIG. 10. FIG. 9 and FIG. 10 are flowcharts illustrating the face recognition method according to the present example embodiment, respectively.

First, a process from capturing by the fixed camera 20 to temporary storage of a face feature amount of a detected face image will be described in detail by using FIG. 9.

The image data of images captured by the fixed camera 20 is periodically transmitted to the face matching apparatus 30. The image data acquisition unit 308 determines whether or not it is the timing of transmission of image data from the fixed camera 20 (step S202). If it is not the timing of transmission of image data (step S202, NO), the image data acquisition unit 308 stands by for an arrival of the timing.

If it is the timing of transmission of image data from the fixed camera 20 (step S202, YES), the image data acquisition unit 308 acquires image data transmitted from the fixed camera 20 (step S204). Before the next step S206, the image data acquisition unit 308 can perform image processing such as a correction process on the acquired image data.

Next, the face detection unit 310 performs face detection on an image of image data acquired by the image data acquisition unit 308 and, from the image, detects a face image of a visitor in the area in front of the gate apparatus 10 (step S206). If no face image is detected (step S208, NO), the process returns to step S202 and stands by for transmission of next image data from the fixed camera 20.

If a face image is detected by the face detection unit 310 (step S208, YES), the face feature amount extraction unit 312 extracts a face feature amount for a detected face image that is the detected face image (step S210).

Further, the face feature amount extraction unit 312 temporarily stores the face image data of the detected face image together with the face feature amount extracted from the detected face image in the storage unit 304 in association with each other (step S212). At this time, the face feature amount extraction unit 312 temporarily stores a detection number that is a number identifying the image data and the capturing time when the detected face image is captured in the storage unit 304 in association with each other for the detected face image, together with face image data and the face feature amount thereof.

The process illustrated in FIG. 9 described above is repeatedly performed every time the timing of transmission of image data from the fixed camera 20 arrives during the operation of the face recognition system 1 according to the present example embodiment.

Next, a process from ticket presentation of an annual pass to gate control will be described by using FIG. 10. The processes for both cases when a registered face image associated with ID information read by the reading unit 108 is present and when no such registered face image is present will be described below.

In the gate apparatus 10, the reading unit 108 stands by until ticket presentation of an annual pass is performed (step S302, NO). During standby for ticket presentation, the gate 106 is closed.

In response to ticket presentation of an annual pass by a visitor at the reading unit 108 (step S302, YES), the reading unit 108 reads ID information recorded in the annual pass from the annual pass (step S306).

Subsequently, the gate control unit 112 transmits the ID information read by the reading unit 108 to the face matching apparatus 30 (step S306).

In the face matching apparatus 30, the face matching unit 314 transmits, to the datacenter server 40 via the network 60, the ID information transmitted from the gate control unit 112. Thereby, the face matching unit 314 inquires of the datacenter server 40 whether or not a registered face image registered in association with the ID information is present (step S308). The datacenter server 40 responds to the inquiry whether or not a registered face image is present for the face matching unit 314.

If a registered face image is present (step S308, YES), the face matching unit 314 acquires, online, the face feature amount of the registered face image registered in association with the ID information from the datacenter server 40 via the network 60 (step S310).

Further, the face matching unit 314 refers to a relational database of the storage unit 304 to acquire, offline, face feature amounts of N detected face images associated with the capturing time included in a predetermined period before ticket presentation of an annual pass (step S312).

The face matching unit 314 performs N:1 matching that sequentially matches respective face feature amounts of the acquired N detected face images against the face feature amount of the acquired registered face image (step S314). If the matching score is less than a predetermined threshold as a result of matching for a certain detected face image, the face matching unit 314 determines that the matching is unmatched and performs matching of the face feature amount of the next detected face image with the face feature amount of the registered face image. On the other hand, if the matching score is greater than or equal to the predetermined threshold as a result of matching for the certain detected face image, the face matching unit 314 determines that the matching is matched and completes the matching process.

If the matching performed by the face matching unit 314 is matched (step S316, YES), the face matching unit 314 transmits a matching-matched signal indicating that the matching performed by the face matching unit 314 is matched to the gate apparatus 10 (step S318).

In the gate apparatus 10, in response to transmission of a matching-matched signal from the face matching unit 314, the gate control unit 112 opens the gate 106 (step S320). Thereby, the visitor performing ticket presentation is allowed to walk through 114 of the gate apparatus 10 and enter the inside of the facility as a person who is successful in identity verification.

The gate control unit 112 closes the gate 106 after the visitor has passed through the path 114 (step S322).

On the other hand, if all the matching performed by the face matching unit 314 is unmatched (step S316, NO), the face matching unit 314 transmits a matching-unmatched signal indicating that all the matching performed by the face matching unit 314 is unmatched to the gate apparatus 10 (step S324).

In the gate apparatus 10, in response to transmission of a matching-unmatched signal from the face matching unit 314, the gate control unit 112 maintains the closed state of the gate 106 (step S326). At this time, the gate control unit 112 outputs a warning by sounding an alert sound of a not-shown alert provided to the gate apparatus 10, turning on an alert light, or the like (step S328). As a result, the visitor performing ticket presentation is unable to enter the inside of the facility at this stage as a person who is failed in identity verification. In this case, an action such as identity verification again performed by the staff of the facility is made, for example.

Unlike the above case where a registered face image is present, in a case of not-registered where no registered face image is present (step S308, NO), the face matching unit 314 displays a registration window on the display unit 306 for the staff of the facility (step S330). Specifically, the face matching unit 314 displays, on the display unit 306, a registration window in which N detected face images associated with the capturing time included in a predetermined period before the ticket presentation of the annual pass are indicated. The N detected face images displayed here are the same as the N detected face images from which the face feature amount is acquired in step S312.

Figure 11:
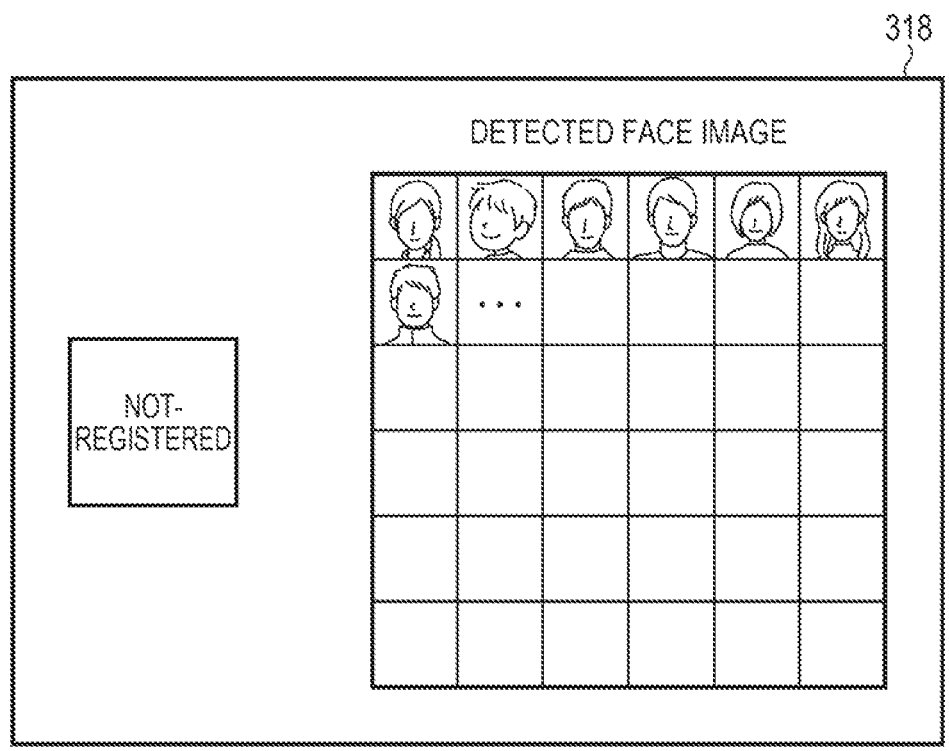
FIG. 11 is a schematic diagram illustrating an example of a registration window displayed on a display unit in the face recognition method according to the first example embodiment of the present invention.

FIG. 11 illustrates an example of a registration window displayed on the display unit 306. As illustrated in FIG. 11, N detected face images are displayed in the registration window 318. Further, display of "not-registered" that indicates a case of not-registered where no registered face image is present is displayed in the registration window 318. In this way, N detected face images are displayed in the registration window 318 displayed on the display unit 306 so that the staff of the facility can visually select a detected face image to be registered as a registered face image from the N detected face images.

The staff of the facility views the registration window displayed on the display unit 306 and manually selects a detected face image to be registered as a registered face image (step S332). Specifically, the staff of the facility selects, as a face image to be registered as a registered face image, a detected face image which is determined to be the same person as the visitor on the ticket presentation out of N detected face images displayed on the registration window. The display unit 306 is formed of a touch panel, for example, and also functions as an input unit. In this case, the staff of the facility can touch a detected face image displayed on the registration window and input the selected result to the face matching apparatus 30. Note that the selected result can be input to the face matching apparatus 30 also by other input units such as a mouse, a keyboard, or the like.

As discussed above, in the present example embodiment, in a case of not-registered where no registered face image is present, a face image to be registered as a registered face image is selected from the detected face images. It is therefore not necessary to separately capture an image of a face of a visitor on thicket presentation by image capturing performed by the staff of the facility for acquiring a face image to be registered as a registered face image. Therefore, according to the present example embodiment, a registered face image can be smoothly registered.

In the face matching apparatus 30, the face matching unit 314 transmits the result selected by the staff of the facility to the datacenter server 40 (step S334). Specifically, the face matching unit 314 transmits, to the datacenter server 40, image data of the detected face image selected as a face image to be registered as a registered face image and the face feature amount thereof.

In the datacenter server 40, the control unit 402 stores and registers the transmitted detected face image in the storage unit 404 as a registered face image in association with the ID information of the annual pass on the ticket presentation (step S336). At this time, the control unit 402 stores the face feature amount of a new registered face image together in the storage unit 404 in association with the ID information of the annual pass on the ticket presentation. In this way, a registered face image is newly registered by the control unit 402 that functions as a registration unit.

Upon the completion of the registration of the registered face image, the datacenter server 40 transmits a registration completion signal indicating that registration of a registered face image is completed to the gate apparatus 10 via the face matching apparatus 30 (step S338).

In the gate apparatus 10, in response to the transmission of the registration completion signal from the datacenter server 40, the gate control unit 112 opens the gate 106 (step S320). Thereby, the visitor on the ticket presentation can walk through the path 114 of the gate apparatus 10 and enter the inside of the facility as a person who made registration of a new registered face image.

The gate control unit 112 closes the gate 106 after the visitor has passed through the path 114 (step S322).

The process illustrated in FIG. 10 described above is repeatedly performed every time ticket presentation is made at the reading unit 108 of the gate apparatus 10 during the face recognition method according to the present example embodiment being performed.

As discussed above, according to the present example embodiment, a face feature amount of a detected face image detected from an image captured by the fixed camera 20 before ticket presentation of an annual pass is performed is matched against a face feature amount of a registered face image registered in association with ID information of the annual pass on the ticket presentation. Therefore, according to the present example embodiment, face matching can be performed smoothly in a short time.

Furthermore, according to the present example embodiment, since a face image to be registered as a registered face image is selected and registered out of detected face images, when no registered face image used for matching in face authentication is present, a registered face image can be registered smoothly.

Note that, while the case where a single visitor is captured in one frame of image captured by the fixed camera 20 as illustrated in FIG. 3 has been described above as an example, a plurality of visitors may be captured in one frame of image captured by the fixed camera 20.

Figure 12:
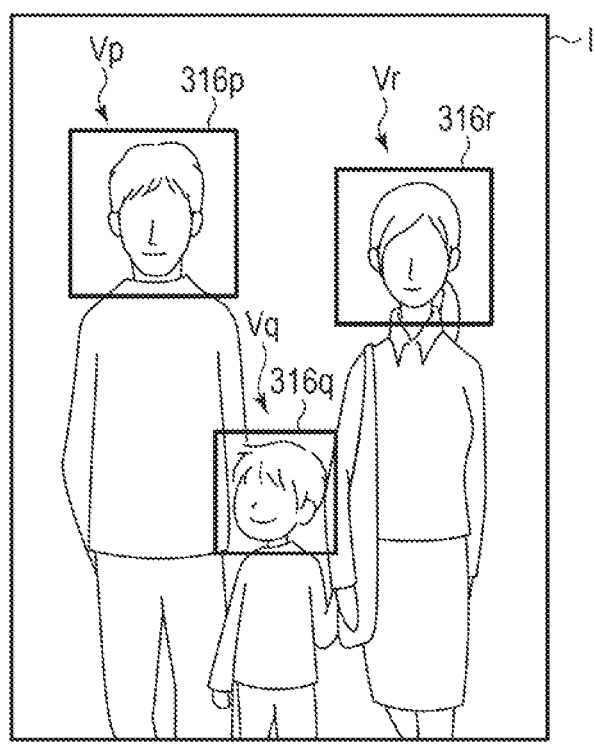
FIG. 12 is a schematic diagram illustrating another example of an image captured by a fixed camera in the face recognition system according to the first example embodiment of the present invention.

FIG. 12 illustrates another example of one frame of image captured by the fixed camera 20. As illustrated in FIG. 12, in one frame of image I, three visitors Vp, Vq, and Vr are captured in an area in front of the gate apparatus 10. In this way, a plurality of visitors may be captured in one frame of image I captured by the fixed camera 20. In such a case, the face detection unit 310 detects respective face images of the plurality of visitors Vp, Vq, and Vr from the image I captured by the fixed camera 20 as indicated by detection frames 316p, 316q, and 316r in FIG. 12. The plurality of detected face images detected from one frame of image in such a way are processed as an image of a matching subject to be matched against the registered face image, respectively, in the same manner as described above.

Second Example Embodiment

A face recognition system and a face recognition method according to a second example embodiment of the present invention will be described by using FIG. 13 to FIG. 15. Note that components similar to those in the face recognition system and the face recognition method according to the first example embodiment described above will be labeled with the same reference numeral, and the description thereof will be omitted or simplified.

First, the face recognition system according to the present example embodiment will be described by using FIG. 22 and FIG. 23. FIG. 22 is a schematic diagram illustrating the face recognition system according to the present example embodiment. FIG. 23 is a block diagram illustrating a functional configuration of the face recognition system according to the present example embodiment.

In the above first embodiment, the case of performing identity verification by face matching on a visitor as an authentication subject who is going to enter the inside of the facility by using an admission ticket at an entrance gate of a facility has been described. However, a situation of performing identity verification by face matching is not limited thereto. In the present example embodiment, a case of performing identity verification by face matching on a shopping customer as an authentication subject who performs electronic payment by using a credit card, a debit card, electronic money, or the like at a cashier area such as a register counter where a register terminal is installed in a shop will be described.

Figure 13:
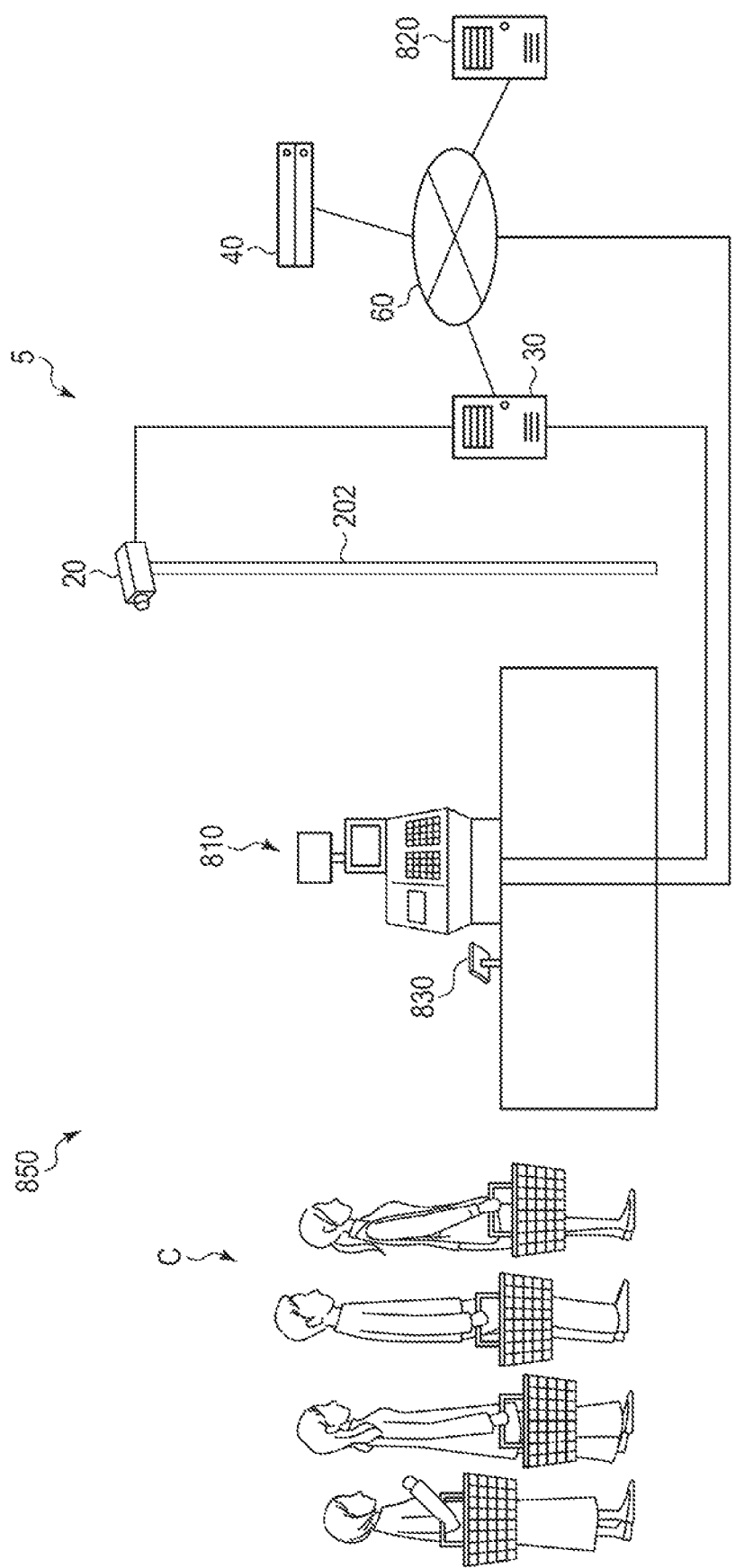
FIG. 13 is a schematic diagram illustrating a face recognition system according to a second example embodiment of the present invention.
Figure 14:
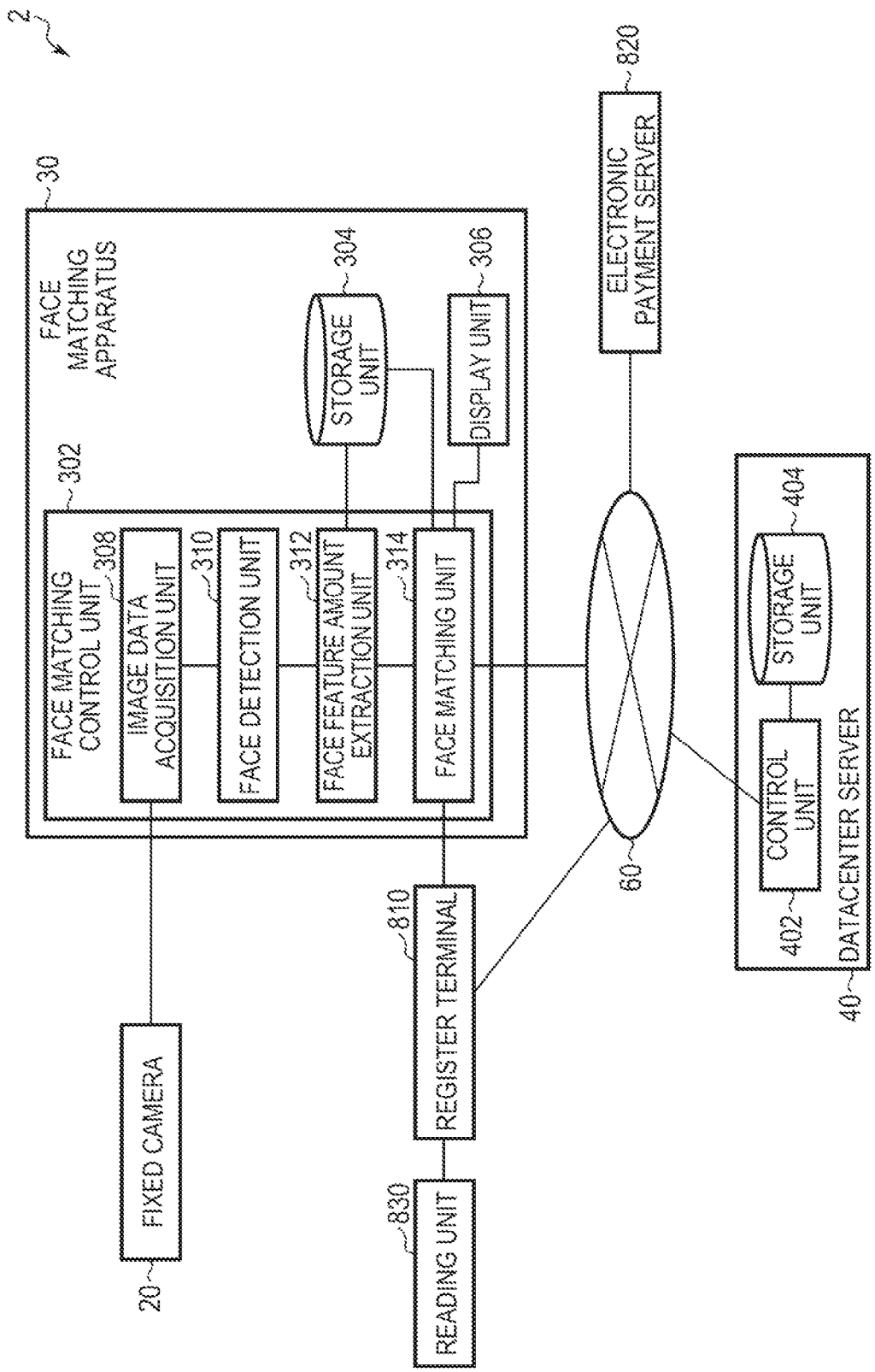
FIG. 14 is a block diagram illustrating a functional configuration of the face recognition system according to the second example embodiment of the present invention.

As illustrated in FIG. 13 and FIG. 14, a face recognition system 2 according to the present example embodiment includes a register terminal 810, the fixed camera 20, the face matching apparatus 30, the datacenter server 40, and an electronic payment server 820. The register terminal 810, the fixed camera 20, and the face matching apparatus 30 are installed at a casher area 850 of a shop. On the other hand, the datacenter server 40 is installed inside a datacenter remote from the casher area 850, for example. Further, the electronic payment server 820 is a server of a company that provides an electronic payment system, for example.

The face matching apparatus 30 and the datacenter server 40 are connected to a network via the network 60, respectively, and can communicate with each other via the network 60 in the same manner as in the first example embodiment.

Further, the register terminal 810 and the electronic payment server 820 are connected to a network via the network 60, respectively, and can communicate with each other via the network 60.

Further, the register terminal 810 and the fixed camera 20 are directly, locally connected to the face matching apparatus 30 in a communicable manner through cable connection or the like, respectively. The connection among the register terminal 810, the fixed camera 20, and the face matching apparatus 30 may be of a wired scheme or a wireless scheme.

Next, each unit of the face recognition system 2 in the present example embodiment will be described in detail.

The register terminal 810 reads price information of a purchase item purchased by a shopping customer as well as other information and performs an accounting process for the purchase item. As described later, the register terminal 810 performs an accounting process based on electronic payment information notified when identity verification is successful by face matching.

A reading unit 830 is connected to the register terminal 810. The reading unit 830 is installed near the register terminal 810 adjacent to the register terminal 810. The reading unit 830 reads information recorded in a membership card of a shop carried by a shopping customer. Specifically, in a membership card, ID information that uniquely identifies the membership card is recorded. The reading unit 830 reads ID information from a membership card. The ID information read by the reading unit 830 is a membership number of the membership card, for example. A shopping customer using a shop carries a membership card when using the shop and causes the reading unit 830 to read the membership card in accounting. The membership card is a medium that is carried by a shopping customer, which is an authentication subject, and required when the shopping customer makes a payment and in which ID information uniquely identifying this is recorded. As described later, in the datacenter server 40, information on registered members to which membership cards are issued in association with ID information on the membership cards is accumulated.

The reading unit 830 has a reading scheme in accordance with a recording scheme of ID information of a membership card. For example, when a membership card has ID information recorded in a one-dimensional code such as a barcode or a two-dimensional code such as a QR code (registered trademark), the reading unit 108 is a code reader such as a barcode reader, a QR code reader, or the like. Further, for example, when a membership card has ID information recorded in a non-contact IC card or a non-contact IC tug with Radio Frequency Identification (RFID), the reading unit 830 is an RFID reader.

When there is ticket presentation of a membership card on the reading unit 830, the reading unit 830 reads ID information recorded in the membership card from the membership card. Note that ticket presentation here means that a shopping customer who is an authentication subject causes the reading unit 830 to read information including the ID information recorded in a membership card.

The reading unit 830 transmits ID information read from a membership card to the register terminal 810. The register terminal 810 transmits, to the face matching apparatus 30, the ID information of the membership card transmitted from the reading unit 830.

Further, the register terminal 810 performs an accounting process based on the electronic payment information transmitted from the face matching apparatus 30 described later.

The fixed camera 20 is fixed to the upper end of a support pillar 202 installed on the exit side of the cashier area 850 with respect to the register terminal 810. The fixed camera 20 captures an image of an area in front of the register terminal 810, and the orientation facing the entrance side of the cashier area 850 is fixed. The fixed camera 20 is fixed at a height located above a head of a human of a height of around 200 cm, for example, from the ground face at the cashier area 850 and is directed obliquely downward to face an area in front of the register terminal 810. Note that a fixing scheme of the fixed camera 20 is not limited to a scheme using the support pillar 202. For example, the fixed camera 20 may be hanged from and fixed to the ceiling.

The fixed camera 20 fixed as described above captures an image of an area in front of the register terminal 810 that is the entrance side to the installation area of the register terminal 810 and the reading unit 830. Thereby, the fixed camera 20 can capture a shopping customer C in the area in front of the register terminal 10 that is the entrance side to the installation area of the reading unit 830.

Since other features of the fixed camera 20 is the same as those in the above first example embodiment, the description thereof will be omitted.

The face matching apparatus 30 has the face matching control unit 302, the storage unit 304, and the display unit 306 in the same manner as the first example embodiment. The face matching control unit 302 includes the image data acquisition unit 308, the face detection unit 310, the face feature amount extraction unit 312, and the face matching unit 314.

The image data acquisition unit 308 sequentially acquires image data of images transmitted from the fixed camera 20 at a predetermined cycle in the same manner as the first example embodiment.

The face detection unit 310 performs face detection on respective images of image data sequentially acquired from the image data acquisition unit 308 in the same manner as the first example embodiment. Note that, in the present example embodiment, the face detection unit 310 detects a face image of a shopping customer in an area in front of the register terminal 810.

The face feature amount extraction unit 312 extracts a face feature amount for respective detected face images detected by the face detection unit 310 in the same manner as the first example embodiment. Further, the face feature amount extraction unit 312 temporarily stores face image data, a face feature amount, a detection number, and a capturing time in the storage unit 304 in association with each other for respective detected face images in the same manner as the first example embodiment.

A relational database is configured in the storage unit 304, and face feature amounts and data related thereto are temporarily stored for a certain time period from the capturing time for respective detected face images in the same manner as the first example embodiment.

In response to ticket presentation of a membership card at the reading unit 830 connected to the register terminal 810, the face matching unit 314 performs identity verification by face matching for a shopping customer who made ticket presentation of the membership card at the reading unit 830.

ID information read by the reading unit 830 from the membership card on ticket presentation is transmitted to the face matching unit 314. The face matching unit 314 acquires the transmitted ID information and, via the network 60 from the datacenter server 40 described later, acquires a face feature amount of a registered face image registered in association with the ID information. A person of a registered face image acquired by the face matching unit 314 in such a way is a valid user who is allowed to validly use the membership card on ticket presentation. A valid user of a membership card is a registered member to which the membership card was issued, for example.

For some ID information, however, there may be a case of not-registered where neither associated registered face image nor face feature amount thereof is present in the datacenter server 40 in the same manner as the first example embodiment. For example, when a membership card is used for the first time, neither registered face image associated with ID information of the membership card nor face feature amount thereof may be present. A process for such a case of not-registered will be described after a process when a registered face image is present is described.

Further, in the same manner as the first example embodiment, the face matching unit 314 refers to the relational database of the storage unit 304 and acquires face feature amounts of N detected face images associated with the capturing time included in a predetermined period before ticket presentation. That is, the face matching unit 314 acquires face feature amounts of N detected face images captured by the fixed camera 20 before the reading unit 830 reads ID information from a membership card.

The face matching unit 314 performs N:1 matching that sequentially matches respective face feature amounts of N detected face images, which have been captured before ticket presentation of a membership card, against a face feature amount of a registered face image in the same manner as the first example embodiment.

If matching by the face matching unit 314 is matched, this means that a valid user of a membership card on ticket presentation is in shopping customers in front of the register terminal 810 before the ticket presentation. Thus, it can be estimated that a valid user of a membership card made the ticket presentation of the membership card. Therefore, in this case, identity verification by face matching is successful.

On the other hand, if all the matching by the face matching unit 314 is unmatched, this means that there is no valid user of a membership card on ticket presentation in shopping customers in front of the register terminal 810 before the ticket presentation. Therefore, in this case, identity verification by face matching is failed.

A matching result or the like by the face matching unit 314 can be displayed on the display unit 306. The staff of the shop can confirm a matching result or the like by viewing the display on the display unit 306. Further, a registered window used for newly registering a registered face image can be displayed on the display unit 306 as described later.

The face matching unit 314 transmits, to the register terminal 810, a matching result signal that is a signal indicating the matching result described above. Specifically, the face matching unit 314 transmits, to the register terminal 810, a matching-matched signal that is a signal indicating that the matching performed by the face matching unit 314 is matched or a matching-unmatched signal that is a signal indicating that all the matching performed by the face matching unit 314 is unmatched.

Furthermore, if the matching is matched, the face matching unit 314 acquires payment option information via the network 60 from the datacenter server 40 described later. The payment information is information used for performing an electronic payment stored in association with ID information of a membership card in which matching is matched and may be a credit card number or electronic money ID information, for example. The face matching unit 314 transmits the acquired payment option information to the register terminal 810 together with the matching-matched signal.

When a matching-matched signal is transmitted from the face matching unit 314, the register terminal 810 requests an electronic payment to the electronic payment server 820 described later. In this case, the register terminal 810 transmits, to the electronic payment server 820, electronic payment information that is information including the payment option information transmitted together with the matching-matched signal and an accounting price of a purchased item.

On the other hand, when a matching-unmatched signal is transmitted from the face matching unit 314, the register terminal 810 uses a warning display, a warning sound, or the like to notify the shop staff operating the register terminal 810 that the electronic payment cannot be made.

Further, as described later, when no registered face image is present, in response to a registration completion signal and payment option information transmitted from the datacenter server 40, the register terminal 810 transmits electronic payment information to the electronic payment server 820. The registration completion signal is a signal indicating that registration of a registered face image is completed in the datacenter server 40.

The datacenter server 40 has the control unit 402 and the storage unit 404 in the same manner as the first example embodiment.

The storage unit 404 accumulates registered face images registered in association with ID information of issued membership cards and face feature amounts thereof. Furthermore, in the storage unit 404, payment option information associated with ID information of membership cards is stored.

In response to a request from the face matching unit 314, the control unit 402 provides, to the face matching unit 314, a face feature amount of a registered face image registered in association with the ID information of the membership card on ticket presentation. Furthermore, in response to a request from the face matching unit 314, the control unit 402 provides, to the face matching unit 314, the payment option information associated with the ID information of the membership card on thicket presentation.

A registered face image can be uploaded to the datacenter server 40 from a terminal in a shop, a terminal of a shopping customer, or the like when the shopping customer acquires a membership card of the shop, for example. In the datacenter server 40, the control unit 402 accumulates the uploaded registered face image in the storage unit 404.

However, the registered face image may not be registered when the membership card is used for the first time. When no registered face image is present as discussed above, the control unit 402 functions as a registration unit that performs a registered process of a registered face image, as described later.

For a registered face image accumulated in the storage unit 404 of the datacenter server 40 as described above, a face feature amount is extracted and accumulated in the storage unit 404 in the same manner as the first example embodiment.

A relational database is configured in the storage unit 404, and face feature amounts of registered face images are stored in association with ID information of membership cards and face image data of the registered face images in the same manner as the first example embodiment. Furthermore, in the storage unit 404, payment option information is stored in association with ID information of membership cards.

Note that, in the relational database of the storage unit 404, for example, information on names, contact addresses, or the like of registered members who are valid users of membership cards is stored in addition to the above in association with ID information of membership cards.

The electronic payment server 820 performs an electronic payment by a credit card, an electronic money, or the like. The electronic payment server 820 performs an electronic payment for an item purchased by a shopping customer based on the electronic payment information transmitted from the register terminal 810.

As described above, the face recognition system 2 according to the present example embodiment matches, against a registered face image registered in association with the ID information of the membership card on the ticket presentation, detected face images captured by the fixed camera 20 before ticket presentation in which the reading unit 830 reads ID information from a membership card is performed. That is, in the face recognition system 2 according to the present example embodiment, the detected face image that is an image of a matching subject to be matched against a registered face image is acquired in advance before ticket presentation of a membership card.

Thus, according to the present example embodiment, after a shopping customer makes ticket presentation of a membership card, it is not necessary to capture a face image of the shopping customer as an image of a matching subject to be matched against a registered face image by the staff of a shop. Further, the shopping customer neither needs to concern about capturing of the face image thereof nor needs to perform a special move such as positioning of the face thereof for the capturing. Therefore, according to the present example embodiment, face matching can be made smoothly in a short time.

Figure 15:
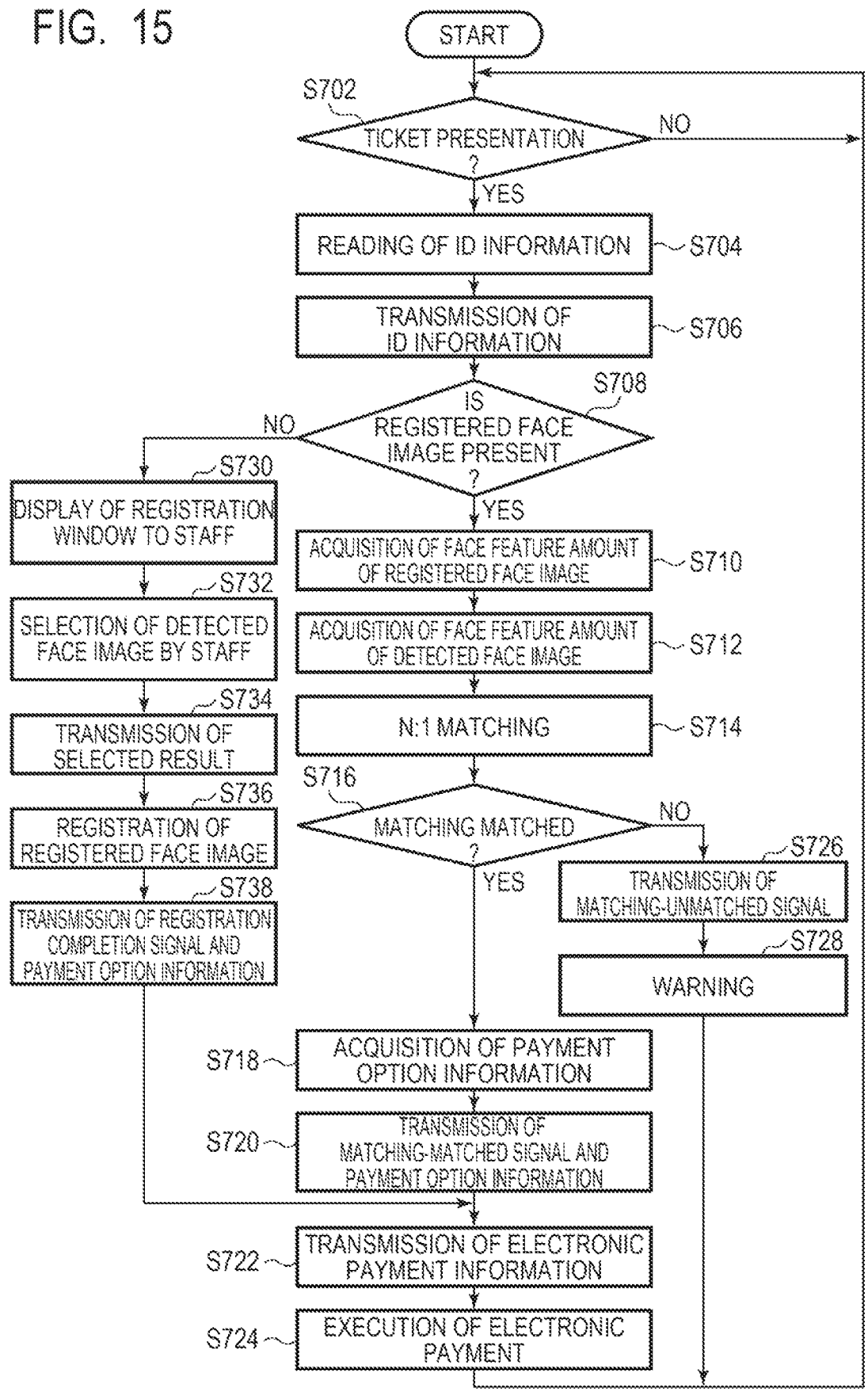
FIG. 15 is a flowchart illustrating a face recognition method according to the second example embodiment of the present invention.

Next, a face recognition method according to the present example embodiment using the face recognition system 2 according to the present example embodiment will be further described by using FIG. 15. FIG. 15 is a flowchart illustrating the face recognition method according to the present example embodiment.

The fixed camera 20 captures an area in front of the register terminal 810 that is the entrance side to the installation area of the reading unit 830 and acquires a plurality of images continuously at a predetermined cycle. Since the process before temporality storing a face feature amount of a detected face image from the capturing by the fixed camera 20 is the same as the process illustrated in FIG. 9 of the first example embodiment except that the capturing area by the fixed camera 20 is different, the description thereof will be omitted.

A process from the ticket presentation of a membership card to execution of an electronic payment will be described below by using FIG. 15. The processes for both cases when a registered face image associated with ID information read by the reading unit 830 is present and when no such registered face image is present will be described below.

At the register terminal 810, the reading unit 830 stands by until ticket presentation of a membership card is performed (step S702, NO).

In response to ticket presentation of the membership card at the reading unit 830 by a shopping customer (step S702, YES), the reading unit 830 reads ID information recorded in the membership card from the membership card (step S704).

Subsequently, the register terminal 810 transmits the ID information read by the reading unit 830 to the face matching apparatus 30 (step S706).

In the face matching apparatus 30, the face matching unit 314 transmits, to the datacenter server 40 via the network 60, the ID information transmitted from the register terminal 810. Thereby, the face matching unit 314 inquires of the datacenter server 40 whether or not a registered face image registered in association with the ID information is present (step S708). The datacenter server 40 responds to the inquiry whether or not a registered face image is present for the face matching unit 314.

If a registered face image is present (step S708, YES), the face matching unit 314 acquires, online, the face feature amount of the registered face image registered in association with the ID information from the datacenter server 40 via the network 60 (step S710).

Further, the face matching unit 314 refers to the relational database of the storage unit 304 to acquire, offline, a face feature amount of N detected face images associated with the capturing time included in a predetermined period before the ticket presentation of the membership card (step S712). That is, the face matching unit 314 acquires face feature amounts of N detected face images captured by the fixed camera 20 before the reading unit 830 reads ID information from the membership card.

The face matching unit 314 performs N:1 matching that sequentially matches respective face feature amounts of the acquired N detected face images against the face feature amount of the acquired registered face image in the same manner as the first example embodiment (step S714).

If the matching performed by the face matching unit 314 is matched (step S716, YES), the face matching unit 314 acquires payment option information from the datacenter server 40 via the network 60 (step S718). Subsequently, the face matching unit 314 transmits, to the register terminal 810 together with the acquired payment option information, a matching-matched signal indicating that the matching performed by the face matching unit 314 is matched (step S720).

In response to the transmission of the matching-matched signal from the face matching unit 314, the register terminal 810 transmits, to the electronic payment server 820, electronic payment information including the transmitted payment option information and an accounting price of a purchased item (step S722).

The electronic payment server 820 executes the electronic payment for the item purchased by the shopping customer based on the electronic payment information transmitted from the register terminal 810 (step S724).

On the other hand, if all the matching performed by the face matching unit 314 is unmatched (step S716, NO), the face matching unit 314 transmits, to the register terminal 810, a matching-unmatched signal indicating that all the matching performed by the face matching unit 314 is unmatched (step S726).

In response to the transmission of the matching-unmatched signal from the face matching unit 314, the register terminal 810 uses a warning display, a warning sound, or the like to notify the shop staff operating the register terminal 810 that the electronic payment cannot be made (step S728).

Unlike the above case where a registered face image is present, in a case of not-registered where no registered face image is present (step S708, NO), the face matching unit 314 displays a registration window on the display unit 306 for the staff of the shop (step S730). Specifically, the face matching unit 314 displays, on the display unit 306, a registration window in which N detected face images associated with the capturing time included in a predetermined period before the ticket presentation of the membership card are indicated. The N detected face images displayed here are the same as the N detected face images from which the face feature amount is acquired in step S712.

In the same manner as in the example illustrated in FIG. 11 of the first example embodiment, N detected face images are displayed in the registration window displayed on the display unit 306 so that the staff of the shop can visually select a detected face image to be registered as a registered face image from the N detected face images.

The staff of the shop views the registration window displayed on the display unit 306 and manually selects a detected face image to be registered as a registered face image (step S732). Specifically, the staff of the shop selects, as a face image to be registered as a registered face image, a detected face image which is determined to be the same person as the shopping customer on the ticket presentation out of N detected face images displayed on the registration window. The display unit 306 is formed of a touch panel, for example, and also functions as an input unit. In this case, the staff of the shop can touch a detected face image displayed on the registration window and input the selected result to the face matching apparatus 30. Note that the selected result can be input to the face matching apparatus 30 also by other input units such as a mouse, a keyboard, or the like.

As discussed above, according to the present example embodiment, in a case of not-registered where no registered face image is present, a face image to be registered as a registered face image is selected from the detected face images, and thus a registered face image can be smoothly registered in the same manner as in the first example embodiment.

In the face matching apparatus 30, the face matching unit 314 transmits the result selected by the staff of the shop to the datacenter server 40 (step S734). Specifically, the face matching unit 314 transmits, to the datacenter server 40, image data of the detected face image selected as a face image to be registered as a registered face image and the face feature amount thereof.

In the datacenter server 40, the control unit 402 stores and registers the transmitted detected face image in the storage unit 404 as a registered face image in association with ID information of the membership card on the ticket presentation (step S736). At this time, the control unit 402 stores the face feature amount of a new registered face image together in the storage unit 404 in association with the ID information of the membership card on the ticket presentation. In this way, a registered face image is newly registered by the control unit 402 that functions as a registration unit.

Upon the completion of the registration of the registered face image, the datacenter server 40 transmits a registration completion signal indicating that registration of a registered face image is completed to the register terminal 810 via the face matching apparatus 30. At this time, the datacenter server 40 transmits payment option information along with the registration completion signal to the register terminal 810 via the face matching apparatus 30 (step S738).

In response to the transmission of the registration completion signal from the face matching unit 314, the register terminal 810 transmits, to the electronic payment server 820, electronic payment information including the transmitted payment option information and the accounting price of the purchased item (step S722).

The electronic payment server 820 executes the electronic payment for the item purchased by the shopping customer based on the electronic payment information transmitted from the register terminal 810 (step S724).

The process illustrated in FIG. 15 described above is repeatedly performed every time ticket presentation is made at the reading unit 830 connected to the register terminal 810 during the face recognition method according to the present example embodiment being performed.

As discussed above, according to the present example embodiment, a face feature amount of a detected face image detected from an image captured by the fixed camera 20 before ticket presentation of a membership card is matched against a face feature amount of a registered face image registered in association with the ID information of the membership card on the ticket presentation. Therefore, according to the present example embodiment, face matching can be performed smoothly in a short time.

Furthermore, according to the present example embodiment, since a face image to be registered as a registered face image is selected and registered out of detected face images, when no registered face image used for matching in face authentication is present, a registered face image can be registered smoothly.

Third Example Embodiment

A computer apparatus according to the third example embodiment of the present invention will be described by using FIG. 16. In the present example embodiment, a computer apparatus used for implementing processes of respective units of the face recognition system according to the first and second example embodiments described above will be described.

Figure 16:
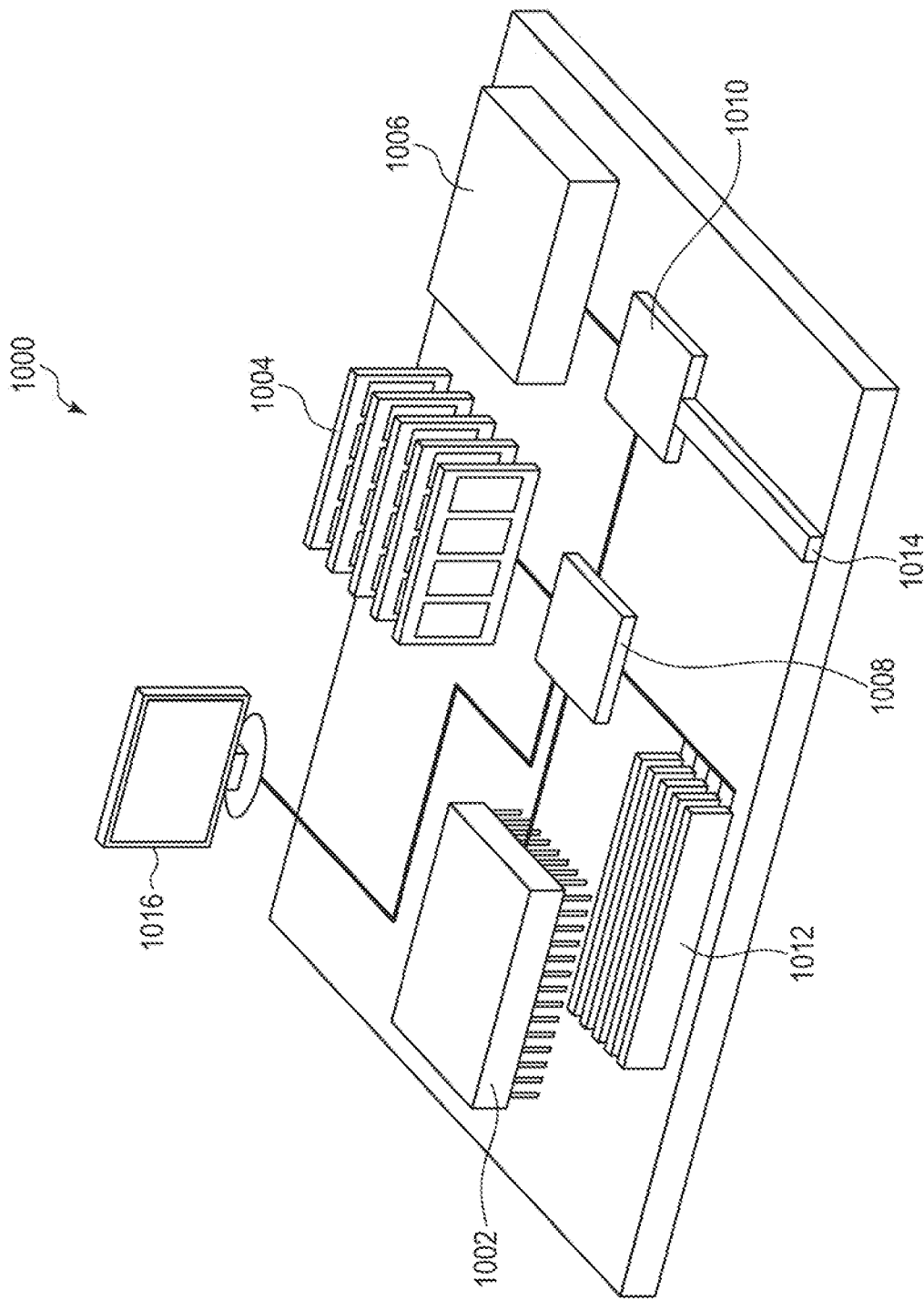
FIG. 16 is a schematic diagram illustrating an example of a computer apparatus.

FIG. 16 illustrates an example of a computer apparatus used for implementing processes of respective units of the face recognition system according to the first and second example embodiments described above will be described. A computer apparatus 1000 illustrated in FIG. 16 is not limited in particular but may be of various types or forms. For example, the computer apparatus 1000 may be a laptop computer, a desktop computer, a workstation, a personal digital assistant, a server, a blade server, a main frame, an embedded system, or the like.

The computer apparatus 1000 has a processor 1002, memory 1004, and a storage device 1006. Further, the computer apparatus 1000 has a high-speed controller 1008 including a high-speed interface and a low-speed controller 1010 including a low-speed interface. The memory 1004 and a high-speed expansion port 1012 are connected to the high-speed controller 1008. Further, an external input/output device such as a display 1016 or the like is connected to the high-speed controller 1008. On the other hand, a low-speed expansion port 1014 and the storage device 1006 are connected to the low-speed controller 1010.

The processor 1002, the memory 1004, the storage device 1006, the high-speed controller 1008, the low-speed controller 1010, and the high-speed expansion port 1012 are connected to each other through various buses. Further, the processor 1002, the memory 1004, the storage device 1006, the high-speed controller 1008, the low-speed controller 1010, and the high-speed expansion port 1012 may be implemented on a common motherboard or may be implemented in other forms as appropriate.

The processor 1002 is a central processing unit (CPU), for example, and is able to process instructions executed within the computer apparatus 1000. Such instructions include an instruction that is used for displaying graphics information of a graphical user interface (GUI) on an external input/output device such as the display 1016 and stored in the memory 1004 or the storage device 1006.

Further, a plurality of processors, a plurality of busses, or a plurality of processors and a plurality of busses can be used as appropriate together with a plurality of memory devices and multiple types of memory devices. Further, a plurality of computer apparatus 1000 can be connected to each device that performs a part of the necessary process. For example, a plurality of computer apparatus 1000 can be connected to each other as a server bank, a group of blade servers, or a multiprocessor system.

The memory 1004 stores therein information within the computer apparatus 1000. For example, the memory 1004 may be a volatile memory unit or a non-volatile memory unit. The memory 1004 may be another computer readable medium, such as a magnetic disk, an optical disk, or the like, for example.

The storage device 1006 can configure mass storage used for the computer apparatus 1000. The storage device 1006 may be, for example, a computer readable medium such as a floppy (registered trademark) disk device, a hard disk device, an optical disk device, a tape device, a solid state memory device such as a flash memory, a disk array, or the like. Further, the storage device 1006 may include such a computer readable storage medium. The storage device 1006 may include a storage area network or a device with another configuration. A computer program product may be tangibly embodied in an information carrier. The computer program product can also store an instruction that executes one or a plurality of processes as described above when executed. The information carrier may be a memory device such as the memory 1004, the storage unit 1006, or the memory on the processor 1002 or may be a computer readable medium or a machine readable medium such as a carrier signal.

The high-speed controller 1008 manages processes in which the bandwidth for the computer apparatus 1000 is intensively used. On the other hand, the low-speed controller 1010 manages processes in which the bandwidth is less intensively used. However, such allocation of the functions is a mere example, and allocation is not limited thereto. Further, a part or a whole of the high-speed controller 1008 may be incorporated in the processor 1002.

The high-speed controller 1008 is connected to the high-speed expansion port 1012 that can accept the memory 1004 and various expansion cards. Further, the high-speed controller 1008 is connected to the display 1016 via a graphics processor or an accelerator, for example.

Further, the low-speed controller 1010 is connected to the storage device 1006 and the low-speed expansion port 1014. The low-speed expansion port 1014 can include, for example, a communication port of various standards such as Universal Serial Bus (USB), Bluetooth (registered trademark), wired or wireless Ethernet (registered trademark), or the like. One or plurality of input/output devices such as a keyboard, a pointing device, a scanner, or the like can be connected to the low-speed expansion port 1014. Further, one or plurality of network devices such as a switch, a router, or the like can be connected to the low-speed expansion port 1014 via a network adapter, for example.

The computer apparatus 1000 can be implemented in many different forms. For example, the computer apparatus 1000 can be implemented in a form of a typical server or a plurality of servers in a form of a group of such servers. Further, the computer apparatus 1000 can be implemented as a part of the rack server system. Furthermore, the computer apparatus 1000 can be implemented in a form of a personal computer such as a laptop computer, a desktop computer, or the like.

The computer apparatus 1000 described above can function as a part of the gate apparatus 10 in the example embodiments described above. In this case, the processor 1002 of the computer apparatus 1000 can function as the gate control unit 112 by executing a program that implements the function of the gate control unit 112 of the gate apparatus 10.

Further, the computer apparatus 1000 can function as the face matching apparatus 30 in the example embodiments described above. In this case, the processor 1002 of the computer apparatus 1000 can function as the face matching control unit 302 by executing a program that implements the function of the face matching control unit 302 of the face matching apparatus 30. That is, the processor 1002 executes programs that implement the functions of respective units of the image data acquisition unit 308, the face detection unit 310, the face feature amount extraction unit 312, and the face matching unit 314. Thereby, the processor 1002 can function as each unit of the image data acquisition unit 308, the face detection unit 310, the face feature amount extraction unit 312, and the face matching unit 314. Further, the storage device 1006 of the computer apparatus 1000 can function as the storage unit 304 of the face matching apparatus 30.

The computer apparatus 1000 can function as the datacenter server 40 in the example embodiments described above. In this case, the processor 1002 of the computer apparatus 1000 can function as the control unit 402 by executing a program that implements the function of the control unit 402 of the datacenter server 40. Further, the storage device 1006 of the computer apparatus 1000 can function as the storage unit 404 of the datacenter server 40.

Note that a part or a whole of the program executed by the processor 1002 of the computer apparatus 1000 can be provided by a computer readable storage medium storing the above, such as a digital versatile disc-read only memory (DVD-ROM), a compact disc-read only memory (CD-ROM), a flash memory such as a USB memory or the like.

Other Example Embodiments

Figure 17:
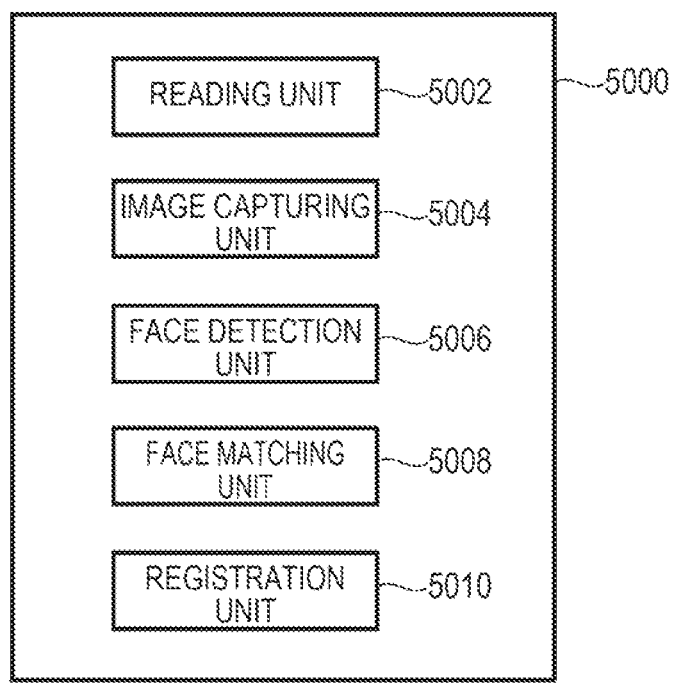
FIG. 17 is a black diagram illustrating a functional configuration of a face recognition system according to another example embodiment of the present invention.

The face recognition system illustrated in each of the example embodiments described above can be configured as illustrated in FIG. 17 according to another example embodiment. FIG. 17 is a block diagram illustrating a functional configuration of a face recognition system according to another example embodiment.

As illustrated in FIG. 17, a face recognition system 5000 according to another example embodiment has a reading unit 5002 that reads identification information from a medium carried by an authentication subject and an image capturing unit 5004 that captures an entrance side to an installation area of the reading unit 5002 to acquire an image. Further, the face recognition system 5000 has a face detection unit 5006 that detects a face image as a detected face image from the image acquired from the image capturing unit 5004. Further, the face recognition system 5000 has a face matching unit 5008 that, when a registered face image associated with identification information read by the reading unit 5002 is present, matches the detected face image detected by the face detection unit 5006 against the registered face image. The face matching unit 5008 matches, against the registered face image, the detected face image captured by the image capturing unit 5004 before the reading unit 5002 reads the identification information. Furthermore, the face recognition system 5000 has a registration unit 5010 that, when no registered face image associated with the identification information read by the reading unit 5002 is present, registers the detected face image as a registered face image. The registration unit 5010 registers, as a registered face image, the detected face image captured by the image capturing unit 5004 before the reading unit 5002 reads the identification information.

Figure 18:
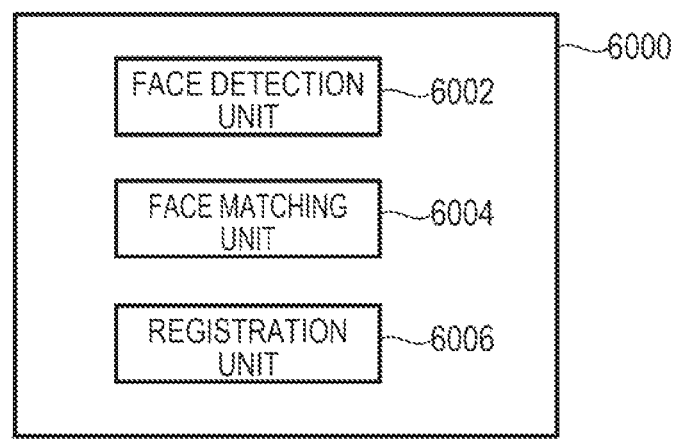
FIG. 18 is a black diagram illustrating a functional configuration of a face matching apparatus according to another example embodiment of the present invention.

Further, the face matching apparatus described in each of the above example embodiments can be configured as illustrated in FIG. 18 according to another example embodiment. FIG. 18 is a block diagram illustrating a functional configuration of a face matching apparatus according to another example embodiment.

As illustrated in FIG. 18, a face matching apparatus 6000 according to another example embodiment has a face detection unit 6002 that detects a face image from an image as a detected face image. The image by which the face detection unit 6002 detects the detected face image is acquired by an image capturing unit that captures and acquires an image of the entrance side to an installation area of a reading unit that reads identification information from an authentication subject. Further, the face matching apparatus 6000 has a face matching unit 6004 that, when a registered face image associated with identification information read by the reading unit is present, matches the detected face image detected by the face detection unit 6002 against the registered face image. The face matching unit 6004 matches, against the registered face image, the detected face image captured by the image capturing unit before the reading unit reads the identification information. Furthermore, the face matching apparatus 6000 has a display unit 6006 that, when no registered face image associated with identification information read by the reading unit is present, displays a detected face image. The display unit 6006 displays detected face images captured by the image capturing unit before the reading unit reads the identification information so that the detected face image to be registered as a registered face image can be visually selected.

Modified Example Embodiments

The present invention is not limited to the example embodiments described above, and various modifications are possible.

For example, while the situations where identity verification by face matching is performed for visitors who intend to enter the inside of the facility as authentication subjects and for shopping customers who make electronic payment as an authentication subject, respectively, have been described as examples in the above example embodiments, the invention is not limited thereto. An authentication subject refers to a person to be verified as to whether or not to have some authority, such as a visitor entering a facility, an entrant at immigration examination, or the like. A situation where identity verification by face matching may be a situation where identity verification by face matching is performed in immigration control, entrance and exit control for a room, or the like, for example.

Further, while the cases where the fixed camera 20 is used as an image capturing unit have been described as examples in the above example embodiments, a camera that functions as the image capturing unit is not limited thereto. For example, instead of the fixed camera 20, a movable camera in which the orientation thereof can be changed by a pan function, a tilt function, or the like may be used as the image capturing unit. In the case of a movable camera, the orientation thereof can be changed by automatic control or remote control.

Further, while the cases where identity verification by face matching is performed after ticket presentation is made by an authentication subject whose annual pass or membership card information is read by the reading unit 108 or 830 have been described as examples in the above example embodiments, the invention is not limited thereto. For example, the reading units 108 and 830 can be configured to read, from a medium carried by an authentication subject, identification information such as ID information uniquely identifying the medium by using wireless communication or the like without requiring action, namely, ticket presentation by an authentication subject.

While the present invention has been described with reference to the example embodiments, the present invention is not limited to the example embodiment described above. Various modification that can be understood by those skilled in the art can be made to the configuration or the details of the present invention within the scope of the present invention.

REFERENCE SIGNS LIST

1, 2 face recognition system
10 gate apparatus
20 fixed camera
30 face matching apparatus
40 datacenter server
108 reading unit
112 gate control unit
302 face matching control unit
304 storage unit
308 image data acquisition unit
310 face detection unit
312 face feature amount extraction unit
314 face matching unit
402 control unit
404 storage unit
810 register terminal
830 reading unit

The invention claimed is:

1. A face recognition system comprising:
a gate configured to allow an authentication subject to enter an inside of a facility;
a reader configured to read first identification information from a medium carried by the authentication subject, the reader being installed in the gate;
an image capturer configured to capture a plurality of images;
a server that stores a face image and second identification information in association with each other;
a memory comprising instructions; and
one or more processors configured to execute the instructions to:
control the image capturer to capture the plurality of images before the reader reads the first identification information;
detect, as a plurality of detected face images, a face image from the plurality of images captured by the image capturer;
determine if a face image associated with identification information that corresponds to the read first identification information has been already registered in the server;
match the plurality of detected face images with a registered face image, the detected face image captured before the reader reads the first identification information;
when there is no registered face image associated with the first identification information in the server, register in the server the detected face image captured by the image capturer in association with the first identification information; and
when receiving a signal indicating that registering the detected face image is completed, open the gate to allow the authentication subject to enter the inside of the facility
wherein the one or more processors is further configured to execute the instructions to:
capture the plurality of images at a predetermined cycle,
acquire the plurality of images in synchronization with the predetermined cycle, and
detect, as the plurality of detected face images, the face image from the plurality of images acquired in synchronization with the predetermined cycle.

2. The face recognition system according to claim 1, wherein the image capturer continuously acquires multiple frames of the plurality of images, and
wherein the one or more processors is further configured to execute the instructions to: detect a plurality of detected face images from the multiple frames of the plurality of images acquired by the image capturer.

3. The face recognition system according to claim 1, wherein the one or more processors is further configured to execute the instructions to:
when there is no registered face image associated with the first identification information, register the detected face image captured by the image capturer,
wherein the plurality of images are captured by the image capturer before the reader reads the first identification information so that the detected face image to be registered as the registration face image can be visually selected, and
wherein the plurality of images include a plurality of face images corresponding to a plurality of authentication subjects.

4. The face recognition system according to claim 1, wherein the image capturer is installed in a vertical orientation so as to capture the plurality of images, which are vertically long.

5. The face recognition system according to claim 1, wherein the one or more processors is further configured to execute the instructions to:
register, as the registered face image, the detected face image selected out of the plurality of detected face images.

6. The face recognition system according to claim 1, wherein the medium is a ticket carried by the authentication subject.

7. The face recognition system according to claim 1, wherein when there is no registered face image associated with the first identification information in the server, the plurality of detected face images is displayed on a display at the same time for selection.

8. The face recognition system according to claim 7, wherein the detected face image captured by the image capturer is registered in association with the first identification information based on selection of one of the plurality of face images displayed on the display as the detected face image.

9. The face recognition system according to claim 8, wherein the selection of one of the plurality of face images displayed on the display is by a staff of the facility.

10. The face recognition system according to claim 1, wherein the detected face image for the matching is a face image detected within a predetermined period with a time immediately before ticket presentation as an end time of reckoning.

11. The face recognition system according to claim 1, wherein the one or more processors is further configured to execute the instructions to:
match the plurality of detected face images that is detected from the plurality of images acquired in synchronization with the predetermined cycle against the registered face image,
wherein the order of the match is ascending order of capturing time.

12. A face recognition method comprising:
reading, by a reader, first identification information from a medium carried by an authentication subject, the reader being installed in a gate configured to allow an authentication subject to enter an inside of a facility;
controlling an image capturer to capture a plurality of images before the reader reads the first identification information;
detecting, as a plurality of detected face images, a face image from the plurality of images acquired by the image capturer;
determining if a face image associated with identification information that corresponds to the read first identification information has been already registered in the server;
matching the plurality of detected face images with a registered face image, the detected face image captured before the reader reads the first identification information; and
when there is no registered face image associated with the first identification information in a server, register in the server, the detected face image captured by the image capturer in association with the first identification information, and when receiving a signal indicating that registering the detected face image is completed open the gate to allow the authentication subject to enter the inside of the facility,
wherein the method further comprises:
capturing the plurality of images at a predetermined cycle,
acquiring the plurality of images in synchronization with the predetermined cycle, and
detecting, as the plurality of detected face images, the face image from the plurality of images acquired in synchronization with the predetermined cycle.

13. A non-transitory storage medium in which a program is stored, wherein the program causes a computer to execute:
controlling a reader to read first identification information from a medium carried by an authentication subject, the reader being installed in a gate configured to allow an authentication subject to enter an inside of a facility;
controlling an image capturer to capture a plurality of images before the reader reads the first identification information;
detecting, as a plurality of detected face images, from the plurality of images acquired by the image capturer;
determining if a face image associated with identification information that corresponds to the read first identification information has been already registered in the server;
matching the plurality of detected face images with a registered face image, the detected face image captured before the reader reads the first identification information; and
when there is no registered face image associated with the first identification information in a server, register in the server, the detected face image captured by the image capturer in association with the first identification information, and when receiving a signal indicating that registering the detected face image is completed and open the gate to allow the authentication subject to enter the inside of the facility,
wherein the method further comprises:
capturing the plurality of images at a predetermined cycle,
acquiring the plurality of images in synchronization with the predetermined cycle, and
detecting, as the plurality of detected face images, the face image from the plurality of images acquired in synchronization with the predetermined cycle.

* * * * *